United States Patent
Raychaudhuri et al.

(10) Patent No.: US 12,351,893 B2
(45) Date of Patent: Jul. 8, 2025

(54) 3D PRINTERS AND FEEDSTOCKS FOR 3D PRINTERS

(71) Applicant: Yazaki Corporation, Tokyo (JP)

(72) Inventors: Satyabrata Raychaudhuri, Thousand Oaks, CA (US); Yongan Yan, Thousand Oaks, CA (US); Leonid Grigorian, Camarillo, CA (US)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 18/601,913

(22) Filed: Mar. 11, 2024

(65) Prior Publication Data
US 2024/0209477 A1 Jun. 27, 2024

Related U.S. Application Data

(60) Continuation of application No. 17/169,169, filed on Feb. 5, 2021, now abandoned, which is a division of
(Continued)

(51) Int. Cl.
*B29C 64/153* (2017.01)
*B22F 1/16* (2022.01)
(Continued)

(52) U.S. Cl.
CPC .............. *C22C 1/1084* (2013.01); *B22F 1/16* (2022.01); *B22F 10/00* (2021.01); *B29C 64/153* (2017.08);
(Continued)

(58) Field of Classification Search
CPC ... B29C 64/153; B29C 64/165; B29C 64/268; B29C 64/314; B33Y 10/00; B33Y 70/00;
(Continued)

(56) References Cited

U.S. PATENT DOCUMENTS

| 4,612,208 A | 9/1986 | Reichenecker |
| 5,204,055 A | 4/1993 | Sachs et al. |

(Continued)

FOREIGN PATENT DOCUMENTS

| CA | 3121870 A1 * | 9/2014 | ............ B22D 11/01 |
| CA | 2893945 A | 6/2015 | |

(Continued)

OTHER PUBLICATIONS

Santos et al., "Nanocomposite of photocurable epoxy-acrylate resin and carbon nanotubes: dynamic-mechanical, thermal and tribological properties", Materials Research, vol. 16, No. 2, 2013, pp. 367-374.

(Continued)

*Primary Examiner* — Nahida Sultana
(74) *Attorney, Agent, or Firm* — Sheppard, Mullin, Richter & Hampton LLP

(57) ABSTRACT

This disclosure relates in general to three dimensional ("3D") printers having a configuration that prepares a three-dimensional object by using a feedstock comprising a metal or a polymer compound and a carbon coating formed on a surface of the compound. This disclosure also relates to such feedstocks and their preparation methods. This disclosure further relates to 3D composite objects prepared by using such printers and feedstocks. This disclosure also relates to carbon containing photocurable formulations and methods for their preparation. This disclosure further relates to electrically conducting 3D polymer composites prepared by using such carbon containing photocurable formulations.

33 Claims, 8 Drawing Sheets

Related U.S. Application Data application No. 15/515,955, filed as application No. PCT/US2015/052530 on Sep. 27, 2015, now Pat. No. 10,926,326.

(60) Provisional application No. 62/184,867, filed on Jun. 26, 2015, provisional application No. 62/059,947, filed on Oct. 5, 2014.

(51) Int. Cl.

| | |
|---|---|
| B22F 10/00 | (2021.01) |
| B29C 64/165 | (2017.01) |
| B29C 64/268 | (2017.01) |
| B29C 64/314 | (2017.01) |
| B29C 71/04 | (2006.01) |
| B33Y 10/00 | (2015.01) |
| B33Y 40/10 | (2020.01) |
| B33Y 70/00 | (2020.01) |
| C22C 1/10 | (2023.01) |
| C22C 26/00 | (2006.01) |
| C22C 32/00 | (2006.01) |
| B22F 10/12 | (2021.01) |
| B22F 10/18 | (2021.01) |
| B22F 10/25 | (2021.01) |
| B22F 10/28 | (2021.01) |

(52) U.S. Cl.
CPC .......... *B29C 64/165* (2017.08); *B29C 64/268* (2017.08); *B29C 64/314* (2017.08); *B29C 71/04* (2013.01); *B33Y 10/00* (2014.12); *B33Y 40/10* (2020.01); *B33Y 70/00* (2014.12); *C22C 26/00* (2013.01); *C22C 32/0084* (2013.01); *B22F 10/12* (2021.01); *B22F 10/18* (2021.01); *B22F 10/25* (2021.01); *B22F 10/28* (2021.01); *Y02P 10/25* (2015.11)

(58) Field of Classification Search
CPC .......... B33Y 40/10; B22F 10/12; B22F 10/18; B22F 10/25; B22F 10/28; C22C 26/00; C22C 26/0084
See application file for complete search history.

(56) References Cited

U.S. PATENT DOCUMENTS

| | | | |
|---|---|---|---|
| 5,597,589 | A | 1/1997 | Deckard |
| 6,780,368 | B2 | 8/2004 | Liu et al. |
| 7,329,379 | B2 | 2/2008 | Boyd et al. |
| 7,431,965 | B2 | 10/2008 | Grigorian et al. |
| 7,879,282 | B2 | 2/2011 | Hopkinson et al. |
| 8,574,485 | B2 | 11/2013 | Kramer et al. |
| 9,136,536 | B2 | 9/2015 | Grigorian et al. |
| 9,617,158 | B2 * | 4/2017 | Raychaudhuri et al. |
| 10,781,512 | B2 * | 9/2020 | Konyashin ............... C22C 29/10 |
| 2002/0145213 | A1 | 10/2002 | Liu et al. |
| 2003/0122111 | A1 * | 7/2003 | Glatkowski .......... C09D 179/08 |
| | | | 423/447.2 |
| 2005/0012247 | A1 | 1/2005 | Kramer et al. |
| 2005/0093208 | A1 | 5/2005 | Boyd et al. |
| 2007/0238056 | A1 | 10/2007 | Baumann et al. |
| 2007/0241482 | A1 | 10/2007 | Giller et al. |
| 2008/0193634 | A1 | 8/2008 | Yaniv et al. |
| 2009/0092747 | A1 | 4/2009 | Zhamu et al. |
| 2010/0108950 | A1 | 5/2010 | Plee |
| 2010/0258111 | A1 | 10/2010 | Shah et al. |
| 2011/0117485 | A1 | 5/2011 | Hermann et al. |
| 2014/0106257 | A1 | 4/2014 | Raychaudhuri et al. |
| 2014/0134334 | A1 | 5/2014 | Pridoehl et al. |
| 2014/0272172 | A1 * | 9/2014 | Zhamu .................... C22C 26/00 |
| | | | 427/457 |
| 2016/0168391 | A1 | 6/2016 | Costa et al. |
| 2016/0271700 | A1 | 9/2016 | Akimoto et al. |
| 2016/0289468 | A1 * | 10/2016 | Turner ..................... D01F 6/42 |
| 2016/0303779 | A1 * | 10/2016 | Kunc ...................... B29C 64/165 |
| 2017/0190579 | A1 | 7/2017 | Cola et al. |
| 2018/0122570 | A1 * | 5/2018 | Li ........................... B33Y 10/00 |
| 2018/0215854 | A1 * | 8/2018 | Paranthaman ..... C08G 18/3821 |
| 2020/0248014 | A1 * | 8/2020 | Bougher ................... C08K 3/04 |

FOREIGN PATENT DOCUMENTS

| | | |
|---|---|---|
| CN | 1976799 A | 6/2007 |
| CN | 1979929 A | 6/2007 |
| CN | 102648088 A | 8/2012 |
| CN | 103553030 A | 2/2014 |
| CN | 103819656 A | 5/2014 |
| CN | 107107494 A | 8/2017 |
| EP | 2 244 268 B1 | 4/2016 |
| EP | 3 312 141 A1 | 4/2018 |
| WO | WO-0156736 A2 * | 8/2001 ............ B22F 3/1055 |

OTHER PUBLICATIONS

Sangermano et al., "Use of single-walled carbon nanotubes as reinforcing fillers in UV-curable epoxy systems", Macromolecular Materials and Engineering, vol. 293, No. 8, 2008, pp. 708-713.

Zhu et al., Alignment of multiwalled carbon nanotubes in bulk epoxy composites via electric field. Journal of Applied Physics, vol. 105, No. 5, 2009, pp. 1-6.

Martin-Gallego et al., Cationic photocured epoxy nanocomposites filled with different carbon fillers. Polymer, vol. 53, No. 9, 2012, pp. 1831-1838.

Santos et al., "Thermal and mechanical properties of a nanocomposite of a photocurable epoxy-acrylate resin and multiwalled carbon nanotubes", Materials Science and Engineering A: Structural Materials Properties Microstructure and Processing, vol. 528, No. 13-14, 2011, pp. 4318-4324.

Gojny et al., "Carbon nanotube-reinforced epoxy-compo sites: enhanced stiffness and fracture toughness at low nanotube content, Composites Science and Technology", vol. 64, No. 15, 2004, pp. 2363-2371.

Dong et al., Study on tribological properties of multi-walled carbon nanotubes/epoxy resin nanocomposites, Tribology Letters, vol. 20, No. 3-4, 2005, pp. 251-254.

Ushiba et al., "3D microfabrication of single-wall carbon nanotube/polymer composites by two-photon polymerization lithography", Carbon, vol. 59, 2013, pp. 283-288.

Kumar et al., "Chemical Vapor Deposition of Carbon Nanotubes: A Review on Growth Mechanism and Mass Production", Journal of Nanoscience and Nanotechnology, vol. 10, 2010, pp. 3739-3758.

Hornyak et al., "Temperature Window for Chemical Vapor Decomposition Growth of Single-Wall Carbon Nanotubes", Journal of Physical Chemistry B, vol. 106, 2002, pp. 2821-2825.

Deutsch et al., "Mix or Match: Choose the Best Mixers Every Time: The choice is wide—from a variety of agitators, to devices that homogenize, emulsify, or disintegrate solids", Chemical Engineering, vol. 105, No. 8, Aug. 1998, pp. 70.

Dresselhaus et al., "Defect characterization in graphene and carbon nanotubes using Raman spectroscopy", Phil. Trans. Royal Society A, vol. 368, 2010, pp. 5355-5377.

Ferrari, "Raman spectroscopy of graphene and graphite: Disorder, electron-phonon coupling, doping and nonadiabatic effects", Solid State Communications, vol. 143, 2007, pp. 47-57.

* cited by examiner (A)

(B)

(C)

3D PRINTERS AND FEEDSTOCKS FOR 3D PRINTERS

CROSS-REFERENCE TO RELATED APPLICATIONS

This application is a continuation of U.S. patent application Ser. No. 17/169,169, entitled "3D Printers and Feedstocks for 3D Printers," filed Feb. 5, 2021, which is a divisional of U.S. patent application Ser. No. 15/515,955, entitled "3D Printers and Feedstocks for 3D Printers," filed Mar. 30, 2017, which is a United States national phase application under 35 U.S.C. 371 of International Application No. PCT/US2015/052530, entitled "3D Printers and Feedstocks for 3D Printers," filed on Sep. 27, 2015, which is based upon and claims priority to the U.S. provisional patent application No. 62/059,947, entitled "Nanocarbon Composites for 3D Printing," filed Oct. 5, 2014, and to the U.S. provisional patent application No. 62/184,867, entitled "Nanocarbon Composites for 3D Printing," filed Jun. 26, 2015. The entire content of each of these patent applications is incorporated herein by reference.

BACKGROUND

Technical Field

This disclosure relates in general to three dimensional ("3D") printers having a configuration that prepares a three-dimensional object by using a feedstock comprising a metal or a polymer compound and a carbon coating formed on a surface of the compound. This disclosure also relates to such feedstocks and their preparation methods. This disclosure further relates to 3D composite objects prepared by using such printers and feedstocks. This disclosure also relates to carbon containing photocurable formulations and methods for their preparation. This disclosure further relates to electrically conducting 3D polymer composites prepared by using such carbon containing photocurable formulations.

Description of Related Art 3D printing, also known as additive manufacturing, is a technology of building three dimensional (3D) solid objects by depositing layers of materials in a design defined by a computer software using many of the commonly available CAD (computer aided design) packages. This technology can create highly customized complex parts and products that are difficult or impossible to manufacture using traditional technologies.

There are several major 3D printing technologies differing mainly in the way layers are built to create the final 3D object. Some methods use melting or softening materials to produce the layers. For example, Selective Laser Sintering (SLS) and Selective Laser Melting (SLM) work by respectively sintering or melting metal, plastic, ceramic, or glass powders using irradiative heating. The heating is done by various light sources emitting electromagnetic radiation in ultraviolet (UV), visible, or infrared (IR) range that is absorbed by the powder, and the radiation energy is converted to heat. Typically, the light source is a lamp or a laser. For example, metal powders are typically heated by fiber lasers emitting IR radiation. For example, the popular M 400 SLS 3D printer manufactured by EOS (Germany) uses a Yb-fiber laser rated at about 1 kilowatt power operating at about 1,070 nanometer wavelength. The second group of methods, exemplified by Fused Deposition Modeling (FDM), works by extruding melted plastic filaments or metal wires through an extrusion nozzle. The third group of methods such as stereolithography (SLA) and Digital Light Processing (DLP) are based on curing (solidifying) liquid materials (such as photopolymer resins) with electromagnetic radiation in UV, visible, or IR ranges. Typically, SLA lasers require much less power compared to SLS lasers. For example, the popular Form1+3D printer manufactured by Formlabs (Somerville, Mass.) uses a 0.12 watt laser operating at about 405 nanometer wavelength.

Current challenges include improving the available 3D printing materials to impart advanced properties and versatility needed for industrial applications, as well as enabling faster 3D printing processes.

For further disclosures related to the nanocarbon 3D printing materials (including nanocarbon oxides), for example, see the following publications: M. N. dos Santos, C. V. Opelt, S. H. Pezzin, C. A. C. E. da Costa, J. C. Milan, F. H. Lafratta, and L. A. F. Coelho, Nanocomposite of photocurable epoxy-acrylate resin and carbon nanotubes: dynamic-mechanical, thermal and tribological properties, Materials Research, 16 (2), 367-374 (2013); M. Sangermano, E. Borella, A. Priola, M. Messori, R. Taurino, and P. Potschke, Use of single-walled carbon nanotubes as reinforcing fillers in UV-curable epoxy systems. Macromolecular Materials and Engineering, 293(8), 708-713 (2008); Y. F. Zhu, C. Ma, W. Zhang, R. P. Zhang, N. Koratkar, and J. Liang, Alignment of multiwalled carbon nanotubes in bulk epoxy composites via electric field. Journal of Applied Physics, 105(5), 1-6 (2009); M. Martin-Gallego, M. Hernandez, V. Lorenzo, R. Verdejo, M. A. Lopez-Manchado, and M. Sangermano, Cationic photocured epoxy nanocomposites filled with different carbon fillers. Polymer, 53(9), 1831-1838 (2012); M. N. dos Santos, C. V. Opelt, F. H. Lafratta, Lepienski C M, S. H. Pezzin, and L. A. F. Coelho, Thermal and mechanical properties of a nanocomposite of a photocurable epoxy-acrylate resin and multiwalled carbon nanotubes, Materials Science and Engineering A: Structural Materials Properties Microstructure and Processing, 528(13-14), 4318-4324 (2011); F. H. Gojny, M. H. G. Wichmann, U. Kopke, B. Fiedler, and K. Schulte, Carbon nanotube-reinforced epoxy-compo sites: enhanced stiffness and fracture toughness at low nanotube content, Composites Science and Technology, 64(15), 2363-2371 (2004); B. Dong, Z. Yang, Y. Huang, and H. L. Li, Study on tribological properties of multi-walled carbon nanotubes/epoxy resin nanocomposites, Tribology Letters, 20(3-4), 251-254 (2005); S. Ushiba, S. Shoji, K. Masui, P. Kuray, J. Kono, and S. Kawata, 3D microfabrication of single-wall carbon nanotube/polymer composites by two-photon polymerization lithography, Carbon 59, 283-288 (2013). The entire content of each of these publications is incorporated herein by reference.

A variety of CNT materials (i.e., single-wall, double-wall, and multi-wall CNTs) are commercially available as dry powders and/or suspensions. These CNT materials may be synthesized by variety of CNT synthesis methods. Some examples of the CNT synthesis methods are arc-discharge methods, laser-vaporization methods, and chemical vapor deposition method (CVD). See, for example, following publications: M. Kumar and Y. Ando, Chemical Vapor Deposition of Carbon Nanotubes: A Review on Growth Mechanism and Mass Production, Journal of Nanoscience and Nanotechnology, vol. 10, pp. 3739-3758 (2010); G. L. Hornyak, L. Grigorian, A. C. Dillon, P. A. Parilla, K. M. Jones, and M. J. Heben, A Temperature Window for Chemical Vapor Decomposition Growth of Single-Wall Carbon Nanotubes, Journal of Physical Chemistry B, vol. 106, pp.

2821-2825 (2002); L. Grigorian, G. L. Hornyak, A. C. Dillon, and M. J. Heben, Continuous growth of single-wall carbon nanotubes using chemical vapor deposition, U.S. Pat. No. 7,431,965, Oct. 7, 2008. The entire content of each of these publications is incorporated herein by reference.

The arc-discharge method employs evaporation of metal-catalyzed graphite electrodes in electric arcs that involve very high (about 4,000° C.) temperatures. The laser-vaporization method employs evaporation of graphite target by lasers in conjunction with high-temperature furnaces. These two methods operate in a batch mode and may therefore be poorly suited to high-volume, low cost production. The CVD method is based on decomposition of carbon-containing gases on supported catalyst and may offer the more efficient, low-cost, and scalable method of producing CNTs. Currently, most commercial CNT materials are manufactured by the CVD method.

For examples of 3D printers and 3D printing techniques, see: Sachs et al. "Three-Dimensional Printing Techniques" U.S. Pat. No. 5,204,055; Deckard "Apparatus for Producing Parts by Selective Sintering" U.S. Pat. No. 5,597,589; Hopkinson et al. "Method and Apparatus for Combining Particulate Material" U.S. Pat. No. 7,879,282; Liu et al. "Layer Manufacturing of a Multi-Material or Multi-Color 3D Object Using Electrostatic Imaging and Lamination" U.S. Patent Application Publication No. 2002/0145213; Kramer et al. "Systems and Methods for Using Multi-Part Curable Materials" U.S. Patent Application Publication No. 2005/0012247; and Boyd et al. "Method and a System for Solid Freeform Fabrication of a Three-Dimensional Object" U.S. Patent Application Publication No. 2005/0093208. The entire content of each of these patents and patent applications is incorporated herein by reference.

SUMMARY OF THE INVENTION

This disclosure relates in general to three dimensional ("3D") printers having a configuration that prepares three-dimensional objects by using a feedstock comprising a metal or a polymer compound and a carbon coating formed on a surface of the compound. This disclosure also relates to such feedstocks and their preparation methods. This disclosure further relates to 3D composite objects prepared by using such printers and feedstocks. This disclosure also relates to carbon containing photocurable formulations and methods for their preparation. This disclosure further relates to electrically conducting 3D polymer composites prepared by using such carbon containing photocurable formulations.

This disclosure relates to a 3D printer that may have a configuration that dispenses a feedstock; deposits a layer of the feedstock on a surface; delivers an electromagnetic radiation to selected areas of the feedstock layer; and prepares a three-dimensional object. The coating may absorb the delivered electromagnetic radiation at a selected area of the feedstock layer, convert the absorbed electromagnetic radiation to heat, and transfer the heat to the metal compound thereby heating the selected area of the feedstock layer, and causing the feedstock to bond to each other, and thereby forming a bonded feedstock layer.

The 3D printer may further have a configuration that deposits a layer of feedstock on a surface of the bonded feedstock layer formed before; and forms another bonded feedstock layer. Thus, the 3D printer of the instant disclosure may prepare an object layer by layer.

This disclosure also relates to a feedstock. The feedstock may comprise a compound and a coating formed on a surface of the compound. The compound may be any compound. For example, the compound may be a metal, a glass, a ceramic, a polymer, or a combination thereof. For example, the compound may be a metal.

This disclosure also relates to carbon containing photocurable formulations and methods for their preparation and to electrically conducting 3D polymer composites prepared by using such carbon containing photocurable formulations. Addition of carbons to photocurable formulations may impart high electrically conductivity and also improve mechanical, thermal, and other properties of 3D-printed polymer objects. For example, carbon containing polymer composites may have higher tensile strength and be less flammable compared to pristine polymer objects.

The coating may comprise a carbon. The carbon may be any type of carbon. For example, the carbon may comprise a nanocarbon, a pyrolytic carbon, a graphite, an activated carbon, an amorphous carbon, a carbon fiber, or a combination thereof. For example, the coating may comprise a nanocarbon. The nanocarbon may be a non-agglomerated nanocarbon. Examples of the nanocarbon may be a carbon nanotube (CNT), a graphene (GR), a fullerene (FL), or a combination thereof. Examples of the carbon nanotube may be a single-wall carbon nanotube, a double-wall carbon nanotube, a multi-wall carbon nanotube, or a combination thereof. For example, the coating may comprise a graphene. Examples of the graphene may be a single layer graphene, a double layer graphene, a multilayer graphene, a graphene strip, or a combination thereof. For example, the coating may comprise a fullerene. Examples the fullerene may be a $C_{60}$, a $C_{70}$, a $C_{76}$, a $C_{78}$, a $C_{84}$, or a combination thereof.

For example, the compound may comprise a metal. The metal compound may be any metal. The examples of the metal compound may be titanium, vanadium, chromium, manganese, iron, cobalt, nickel, copper, zinc, ruthenium, rhodium, palladium, aluminum, indium, gallium, tin, silver, gold, platinum, lead, bismuth, steel, bronze, brass, or a combination thereof. The metal compound may have any shape. For example, the metal compound may comprise a metal particle (e.g. granule), a metal wire, a metal tube, a metal sheet, or a combination thereof.

The coating may absorb the delivered electromagnetic radiation at a selected area of the feedstock layer, may convert the absorbed electromagnetic radiation to heat, and may then transfer the heat to the compound thereby heating the selected area of the feedstock layer, and causing the feedstock to bond to each other, and thereby forming a bonded feedstock layer.

The coating has an absorbance of the electromagnetic radiation. The absorbance of the coating may be higher than absorbance of the compound. For example, the absorbance of the coating may be at least 50 percent, at least 100 percent, at least 500 percent, or at least 800 percent higher than the absorbance of the compound.

Because the coating has an absorbance of the electromagnetic radiation higher than that of the compound, heating rate of the feedstock comprising the compound and the coating may be higher than that of a feedstock without the coating. For example, the heating rate of the feedstock comprising the compound and the coating may be at least 50 percent, at least 100 percent, at least 500 percent, or at least 800 percent higher than that of a feedstock without the coating.

The 3D printer of the instant disclosure may emit the electromagnetic radiation at any power suitable to form a bonded feedstock layer. For example, the 3D printer may emit the electromagnetic radiation with power less than or equivalent to 5,000 watts, with power less than or equivalent to 1,000 watts; with power less than or equivalent to 500 watts; or with power less than or equivalent to 100 watts.

A three-dimensional object prepared by any of the 3D printers disclosed above may be within scope of this instant disclosure.

This disclosure also relates to a feedstock as disclosed above. This feedstock may be used for preparation of 3D objects by any equipment or method. For example, this feedstock may be used for preparation of 3D objects by any of the 3D printers disclosed above.

The feedstock may comprise a compound, and a coating formed on a surface of the compound.

The compound may be any compound. For example, the compound may comprise a metal, a glass, a ceramic, a polymer, or a combination thereof. For example, the compound may comprise a metal. For example, the compound may comprise a polymer.

The coating may comprise a carbon. The carbon may be any type of carbon. For example, the carbon may comprise a nanocarbon, a pyrolytic carbon, a graphite, an activated carbon, an amorphous carbon, a carbon fiber, or a combination thereof. For example, the coating may comprise a nanocarbon. The nanocarbon may be a non-agglomerated nanocarbon. Examples of the nanocarbon may be a carbon nanotube (CNT), a graphene (GR), a fullerene (FL), or a combination thereof. Examples of the carbon nanotube may be a single-wall carbon nanotube, a double-wall carbon nanotube, a multi-wall carbon nanotube, or a combination thereof. For example, the coating may comprise a graphene. Examples of the graphene may be a single layer graphene, a double layer graphene, a multilayer graphene, a graphene strip, or a combination thereof. For example, the coating may comprise a fullerene. Examples the fullerene may be a $C_{60}$, a $C_{70}$, a $C_{76}$, a $C_{78}$, a $C_{84}$, or a combination thereof.

For example, the compound may be a metal. The metal may be any metal. The examples of the metal compound may comprise titanium, vanadium, chromium, manganese, iron, cobalt, nickel, copper, zinc, ruthenium, rhodium, palladium, aluminum, indium, gallium, tin, silver, gold, platinum, lead, bismuth, steel, bronze, brass, or a combination thereof. The metal compound may have any shape. For example, the metal compound may comprise a metal particle (e.g. granule), a metal wire, a metal tube, a metal sheet, or a combination thereof.

The coating has an absorbance of the electromagnetic radiation. The absorbance of the coating may be higher than absorbance of the compound. For example, the absorbance of the coating may be at least 50 percent, at least 100 percent, at least 500 percent, or at least 800 percent higher than the absorbance of the compound.

Because the coating has an absorbance of the electromagnetic radiation higher than that of the compound, heating rate of the feedstock comprising the compound and the coating may be higher than that of a feedstock without the coating. For example, the heating rate of the feedstock comprising the compound and the coating may be at least 50 percent, at least 100 percent, at least 500 percent, or at least 800 percent higher than that of a feedstock without the coating.

The coating may be sufficiently thick to substantially absorb electromagnetic radiation, but not too thick to cause defects in the composite object and thereby negatively impact properties of the composite object. For example, the coating thickness may be in the range of 10 nanometers to 100 micrometers, in the range of 100 nanometers to 10 micrometers, or in the range of 1 micrometer to 5 micrometers.

A three-dimensional object prepared by using any of the feedstocks disclosed above may be within scope of this instant disclosure.

The instant disclosure also relates to a method of preparation ("preparation method"). For example, the preparation method may be preparation of a suspension of a carbon in a solvent ("method of preparation of a carbon suspension"). For example, the method may comprise processing a conditioned mixture at a high shear rate and thereby preparing a carbon suspension. In this preparation method, the conditioned mixture may be prepared by a method comprising processing a solution at a low shear rate. The low shear rate may be lower than 200,000 $s^{-1}$. The high shear rate may be equivalent to or higher than 200,000 $s^{-1}$.

In this method, first, the conditioned mixture may be prepared. The conditioned mixture may be prepared by processing a solution at a shear rate lower than 200,000 $s^{-1}$. In this method, second, a carbon suspension is prepared by processing the conditioned mixture at a shear rate higher than 200,000 $s^{-1}$. After this high shear processing, a carbon suspension comprising substantially non-agglomerated carbons may be obtained.

The solution may comprise a carbon and a solvent. The solution may be substantially free of any dispersing agent. The carbon may be substantially free of functional groups that can facilitate dispersion of the carbon in the solution.

The carbon may be any carbon disclosed above. For example, the carbon may comprise a nanocarbon, a pyrolytic carbon, a graphite, an activated carbon, an amorphous carbon, a carbon fiber, or a combination thereof. For example, the coating may comprise a nanocarbon. The nanocarbon may be a non-agglomerated nanocarbon. Examples of the nanocarbon may be a carbon nanotube (CNT), a graphene (GR), a fullerene (FL), or a combination thereof. Examples of the carbon nanotube may be a single-wall carbon nanotube, a double-wall carbon nanotube, a multi-wall carbon nanotube, or a combination thereof. For example, the coating may comprise a graphene. Examples of the graphene may be a single layer graphene, a double layer graphene, a multilayer graphene, a graphene strip, or a combination thereof. For example, the coating may comprise a fullerene. Examples the fullerene may be a $C_{60}$, a $C_{70}$, a $C_{76}$, a $C_{78}$, a $C_{84}$, or a combination thereof.

In this method, the solvent may be any solvent. For example, the solvent may comprise water, an acid, a base, an aromatic solvent, an alcohol, an aromatic solvent, benzene, halogenated benzene, xylene, toluene, a dichlorobenzene, dimethylformamide, formamide and its derivatives, N-methylpyrrolidinone, dichloroethane, dibromoethane, carbon disulfide, pyridine, or a combination thereof.

In this method, the conditioned mixture may substantially be free of any dispersing agent.

The preparation method may further comprise depositing the carbon suspension on a surface of a metal compound.

The metal compound may comprise any metal. For example, the metal compound may comprise titanium, vanadium, chromium, manganese, iron, cobalt, nickel, copper, zinc, ruthenium, rhodium, palladium, aluminum, indium, gallium, tin, silver, gold, platinum, lead, bismuth, steel, bronze, brass, or a combination thereof. The metal compound may have any structural form or shape. For example, the metal compound comprises a metal particle, a metal wire, a metal tube, a metal sheet, or a combination thereof.

The preparation method may further comprise removing the solvent; thereby forming a coating on a surface of the metal compound; and thereby preparing a feedstock. The solvent may be removed until the feedstock is substantially free of solvent. The solvent may be removed by any technique. For example, the solvent may be removed by evaporation, centrifugation, using drying agents (e.g. absorbents or adsorbents), or a combination thereof.

The coating has a thickness. The coating thickness may be in the range of 10 nanometers to 100 micrometers; the range of 100 nanometers to 10 micrometers; or in the range of 1 micrometer to 5 micrometers.

After the removal of the solvent, the coating may essentially comprise the carbon.

Any three-dimensional composite object prepared by using any of the carbon suspension prepared by any of the method disclosed above may be within the scope of the instant disclosure.

The instant disclosure also relates to a carbon containing photocurable formulation. This formulation may comprise a carbon; a photocurable resin; and a photoinitiator (i.e. photocatalyst). The carbon containing photocurable formulation, when cured, may yield a polymer composite with an electrical resistivity lower than or equivalent to 100 ohmcm, or lower than or equivalent to 10 ohmcm, or lower than or equivalent to 1 ohmcm, or lower than or equivalent to 0.1 ohmcm.

The carbon containing photocurable formulation may comprise a nanocarbon, a pyrolytic carbon, a graphite, an activated carbon, an amorphous carbon, a carbon fiber, or a combination thereof. The carbon may comprise a nanocarbon. The carbon may comprise a non-agglomerated nanocarbon. The nanocarbon may comprise a carbon nanotube, a graphene, a fullerene, or a combination thereof. The carbon nanotube may comprise a single-wall carbon nanotube, a double-wall carbon nanotube, a multi-wall carbon nanotube, or a combination thereof. The graphene may comprise a single layer graphene, a double layer graphene, a multilayer graphene, a graphene strip, or a combination thereof. The fullerene may comprise a $C_{60}$, a $C_{70}$, a $C_{76}$, a $C_{78}$, a $C_{84}$, or a combination thereof.

The photocurable resin may comprise a photocurable monomer, a photocurable oligomer, a photocurable polymer, or a combination thereof. The photocurable resin may comprise a monomer, oligomer, or a polymer of a hydrocarbon. The hydrocarbon may be any hydrocarbon. For example, the hydrocarbon may be an acrylate, a methacrylate, an epoxy, a urethane, an ester, a silicone, a styrene, or a combination thereof. For example, the hydrocarbon may comprise a monofunctional hydrocarbon, a difunctional hydrocarbon, a trifunctional hydrocarbon, a multifunctional hydrocarbon, or a combination thereof.

The carbon containing photocurable formulation may have a viscosity. The viscosity of the carbon containing photocurable formulation is in the range of 1 millipascalsecond to 1,000 millipascalsecond at about 25° C.; or in the range of 10 millipascalsecond to 300 millipascalsecond at about 25° C.; or in the range of 50 millipascalsecond to 150 millipascalsecond at about 25° C.

The carbon containing photocurable formulation may comprise a carbon nanotube. The carbon nanotube may comprise a single-wall carbon nanotube, a double-wall carbon nanotube, a multi-wall carbon nanotube, or a combination thereof. The carbon containing photocurable formulation, when cured, may yield a polymer composite with an electrical resistivity lower than or equivalent to 1 ohmcm.

Any three-dimensional polymer composite object prepared by using any of the carbon containing photocurable formulations disclosed above is within the scope of the instant disclosure.

The instant disclosure also relates to a method of preparation of a carbon containing photocurable formulation. The method may comprise processing a conditioned photocurable mixture at a high shear rate and thereby preparing a carbon containing photocurable formulation. The conditioned photocurable mixture may be prepared by a method comprising processing a photocurable mixture at a low shear rate. The photocurable mixture may comprise a carbon, a photocurable resin, and a photoinitiator. The high shear rate may be equivalent to or higher than 200,000 $s^{-1}$; or equivalent to or higher than 500,000 $s^{-1}$; or equivalent to or higher than 1,000,000 $s^{-1}$; or equivalent to or higher than 10,000,000 $s^{-1}$. The low shear rate may be lower than 200,000 $s^{-1}$.

The conditioned photocurable mixture may be substantially free of any dispersing agent. The photocurable mixture may be substantially free of any dispersing agent.

The carbon may substantially be free of functional groups that can facilitate dispersion of the carbon compound in the mixture.

The carbon may comprise a nanocarbon, a pyrolytic carbon, a graphite, an activated carbon, an amorphous carbon, a carbon fiber, or a combination thereof. The nanocarbon may comprise a carbon nanotube, a graphene, a fullerene, or a combination thereof. The carbon nanotube may comprise a single-wall carbon nanotube, a double-wall carbon nanotube, a multi-wall carbon nanotube, or a combination thereof. The graphene may comprise a single layer graphene, a double layer graphene, a multilayer graphene, a graphene strip, or a combination thereof. The fullerene may comprise a $C_{60}$, a $C_{70}$, a $C_{76}$, a $C_{78}$, a $C_{84}$, or a combination thereof.

The photocurable resin may comprise a photocurable monomer, a photocurable oligomer, a photocurable polymer, or a combination thereof.

The photocurable resin may comprise a monomer, oligomer or a polymer of an acrylate, a methacrylate, an epoxy, a urethane, an ester, a silicone, a vinyl alcohol, a vinyl acetate, an alkene, a glycerol, a glycol, a ketone, or a combination thereof.

The carbon containing photocurable formulation has a viscosity, wherein the viscosity of the carbon containing photocurable formulation may in the range of 1 millipascalsecond to 1,000 millipascalsecond at about 25° C.; or in the range of 10 millipascalsecond to 300 millipascalsecond at about 25° C.; or in the range of 50 millipascalsecond to 150 millipascalsecond at about 25° C.

The carbon containing photocurable formulation, when cured, may yield a polymer composite with an electrical resistivity lower than or equivalent to 100 ohmcm; or lower than or equivalent to 10 ohmcm; or lower than or equivalent to 1 ohmcm; or lower than or equivalent to 0.1 ohmcm.

In this preparation method the carbon may comprise a carbon nanotube. The carbon nanotube may comprise a single-wall carbon nanotube, a double-wall carbon nanotube, a multi-wall carbon nanotube, or a combination thereof. The carbon containing photocurable formulation, when cured, may yield a polymer composite with an electrical resistivity lower than or equivalent to 1 ohmcm.

Any three-dimensional polymer composite object prepared by using any of the carbon containing photocurable formulation disclosed above, which may be prepared by any of the methods suitable for preparation of such formulations may be within the scope of the instant disclosure.

Any combination of the above feedstocks; methods of preparation of such feedstocks; carbon containing photocurable formulations; methods of preparation of such formulations; 3D printers; 3D printers that use such feedstocks and/or such formulations; 3D objects; methods of preparation of such 3D objects by using such 3D printers, feedstocks and formulations may be within the scope of the instant disclosure.

These, as well as other components, steps, features, objects, benefits, and advantages, will now become clear from a review of the following detailed description of illustrative embodiments, the accompanying drawings, and the exemplary features.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF VARIOUS EMBODIMENTS

Figure 1:
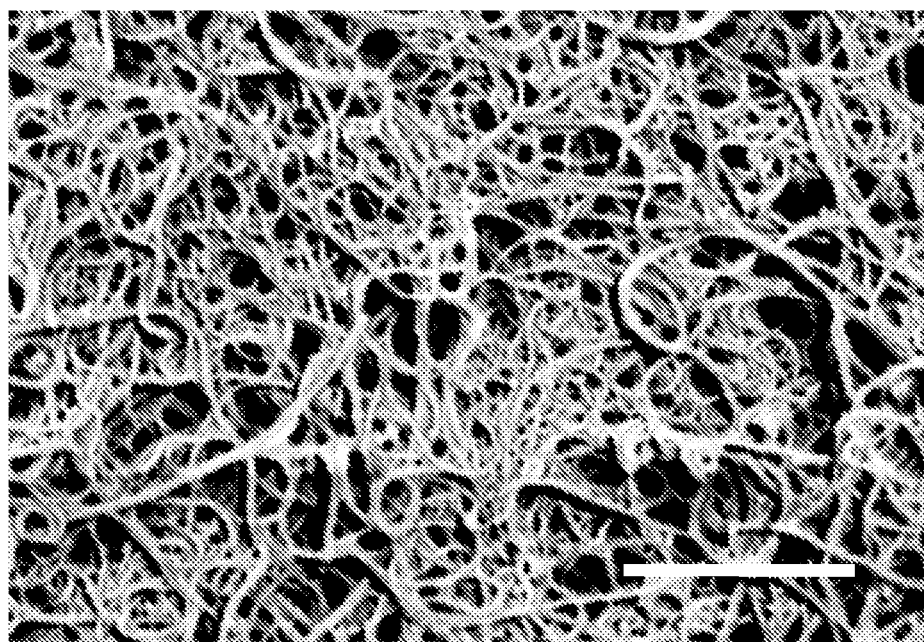
FIG. 1. An exemplary SEM (scanning electron microscope) image of a dried CNT mat showing agglomerated and tangled CNT bundles. The scale bar at the left bottom corner (shown in white color) equals about 1 micrometer.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

In this disclosure, the word "form" may mean "deposit", "coat", "dispose", "laminate", "apply", "place", "provide", "position", "manufacture" or the like. In this disclosure, the phrase "any combination thereof" or "a combination thereof" may mean "a mixture thereof", "a composite thereof", "an alloy thereof", or the like. In this disclosure, the indefinite article "a" and phrases "one or more" and "at least one" are synonymous and mean "at least one".

This disclosure relates in general to three dimensional ("3D") printers having a configuration that prepares three-dimensional objects by using a feedstock comprising a metal or a polymer compound and a carbon coating formed on a surface of the compound. This disclosure also relates to such feedstocks and their preparation methods. This disclosure further relates to 3D composite objects prepared by using such printers and feedstocks. This disclosure also relates to carbon containing photocurable formulations and methods for their preparation. This disclosure further relates to electrically conducting 3D polymer composites prepared by using such carbon containing photocurable formulations.

Addition of carbons and, in particular, nanocarbons, such as carbon nanotubes (CNT), graphenes (GR), fullerenes (FL), and their mixtures in various proportions and combinations, to metal, plastic, ceramic, glass, polymer, and other 3D printing materials may lead to formation of nanocarbon composites with increased electrical conductivity, increased thermal conductivity, increased mechanical strength, and other improvements in properties.

Addition of nanocarbons also may lead to increased absorption of incident light in wide frequency range (e.g., UV, visible, IR) thereby improving the efficiency of irradiative heating of the feedstock and photochemical reactions. This may lead to higher rates and increased throughput of 3D printing processes, thereby making 3D printed parts more competitive on the market.

A major challenge in these tasks is ensuring high degree of dispersion of carbon in the carbon composite materials since only well-dispersed carbons impart useful properties. Typically, carbon agglomeration results in underutilized potential of the composite material and degraded properties of product.

Another challenge is preventing structural or other damage to carbons in the process of fabrication of nanocarbon composites. Damaged carbons may exhibit inferior properties when incorporated in composite materials.

The feedstock of the instant disclosure may provide several advantages to the 3D printing of objects. For example, three dimensional objects may be printed at higher throughputs by using the feedstocks of the instant disclosure. The production costs of such article may thereby be decreased while production rates are increased. The use of these feedstocks may also decrease the power requirements of the 3D printers, thereby decreasing the prices of such printers.

The feedstocks of the instant disclosure may also provide materials with improved properties for 3D printing technologies. These improvements may include (but not limited to) higher electrical and thermal conductivity, better mechanical and thermal properties.

This disclosure relates to a 3D printer that may have a configuration that dispenses a feedstock; deposits a layer of the feedstock on a surface; delivers an electromagnetic radiation to selected areas of the feedstock layer; and prepares a three-dimensional object. The coating may absorb the delivered electromagnetic radiation at a selected area of the feedstock layer, convert the absorbed electromagnetic radiation to heat, and transfer the heat to the metal compound thereby heating the selected area of the feedstock layer, and causing the feedstock to bond to each other, and thereby forming a bonded feedstock layer.

The deposition of the first layer may happen on any surface. For example, this surface may be a surface of another object.

The 3D printer may further have a configuration that deposits a layer of feedstock on a surface of the bonded feedstock layer formed before; and forms another bonded feedstock layer. Thus, the 3D printer of the instant disclosure may prepare an object layer by layer.

This disclosure also relates to a feedstock. The feedstock may comprise a compound and a coating formed on a surface of the compound. The compound may comprise any compound. For example, the compound may comprise a metal, a glass, a ceramic, a polymer, or a combination thereof. For example, the compound may be a metal. For example, the compound may be a polymer.

The coating may comprise a carbon. The carbon may be any type of carbon. For example, the carbon may comprise a nanocarbon, a pyrolytic carbon, a graphite, an activated carbon, an amorphous carbon, a carbon fiber, or a combination thereof.

For example, the coating may comprise a nanocarbon. The nanocarbon may be a non-agglomerated nanocarbon. Examples of the nanocarbon may be a carbon nanotube (CNT), a graphene (GR), a fullerene (FL), or a combination thereof. Examples of the carbon nanotube may be a single-wall carbon nanotube, a double-wall carbon nanotube, a multi-wall carbon nanotube, or a combination thereof.

For example, the coating may comprise a graphene. Examples of the graphene may be a single layer graphene, a double layer graphene, a multilayer graphene, a graphene strip, or a combination thereof.

For example, the coating may comprise a fullerene. Examples the fullerene may be a $C_{60}$, a $C_{70}$, a $C_{76}$, a $C_{78}$, a $C_{84}$, or a combination thereof.

For example, the compound may be a metal compound. The metal compound may be any metal. The examples of the metal compound may be titanium, vanadium, chromium, manganese, iron, cobalt, nickel, copper, zinc, ruthenium, rhodium, palladium, aluminum, indium, gallium, tin, silver, gold, platinum, lead, bismuth, steel, bronze, brass, or a combination thereof.

The metal compound may have any shape. For example, the metal compound may comprise a metal particle (e.g. granule), a metal wire, a metal tube, a metal sheet, or a combination thereof.

The coating may absorb the delivered electromagnetic radiation at a selected area of the feedstock layer, may convert the absorbed electromagnetic radiation to heat, and may then transfer the heat to the compound thereby heating the selected area of the feedstock layer, and causing the feedstock to bond to each other, and thereby forming a bonded feedstock layer.

The coating has an absorbance of the electromagnetic radiation. The absorbance of the coating may be higher than absorbance of the compound. For example, the absorbance of the coating may be at least 50 percent, at least 100 percent, at least 500 percent, or at least 800 percent higher than the absorbance of the compound.

Because the coating has an absorbance of the electromagnetic radiation higher than that of the compound, heating rate of the feedstock comprising the compound and the coating may be higher than that of a feedstock without the coating. For example, the heating rate of the feedstock comprising the compound and the coating may be at least 50 percent, at least 100 percent, at least 500 percent, or at least 800 percent higher than that of a feedstock without the coating.

The coating may be sufficiently thick to substantially absorb electromagnetic radiation, but not too thick to cause defects in the composite object and thereby negatively impact properties of the composite object. For example, the coating thickness may be in the range of 10 nanometers to 100 micrometers, in the range of 100 nanometers to 10 micrometers, or in the range of 1 micrometer to 5 micrometers.

The 3D printer of the instant disclosure may emit the electromagnetic radiation at any power suitable to form a bonded feedstock layer. Lowest emission power that forms a bonded feedstock layer may be preferred since manufacturing cost of the 3D printers and/or operating costs of such printers may thereby be decreased. For example, the 3D printer may emit the electromagnetic radiation with power less than or equivalent to 5,000 watts, with power less than or equivalent to 1,000 watts; with power less than or equivalent to 500 watts; or with power less than or equivalent to 100 watts.

Any three-dimensional object prepared by any of the 3D printers disclosed above may be within scope of this instant disclosure.

This disclosure also relates to a feedstock as disclosed above. This feedstock may be used in preparation of 3D objects by any equipment or method. For example, this feedstock may be used in preparation of 3D objects by any of the 3D printers disclosed above.

The feedstock may comprise a compound, and a coating formed on a surface of the compound.

The compound may be any compound. For example, the compound may comprise a metal, a glass, a ceramic, a polymer, or a combination thereof. For example, the compound may comprise a metal. For example, the compound may comprise a polymer.

The coating may comprise a carbon. The carbon may be any type of carbon. For example, the carbon may comprise a nanocarbon, a pyrolytic carbon, a graphite, an activated carbon, an amorphous carbon, a carbon fiber, or a combination thereof.

For example, the coating may comprise a nanocarbon. The nanocarbon may be a non-agglomerated nanocarbon. Examples of the nanocarbon may be a carbon nanotube (CNT), a graphene (GR), a fullerene (FL), or a combination thereof. Examples of the carbon nanotube may be a single-wall carbon nanotube, a double-wall carbon nanotube, a multi-wall carbon nanotube, or a combination thereof.

For example, the coating may comprise a graphene. Examples of the graphene may be a single layer graphene, a double layer graphene, a multilayer graphene, a graphene strip, or a combination thereof.

For example, the coating may comprise a fullerene. Examples the fullerene may be a $C_{60}$, a $C_{70}$, a $C_{76}$, a $C_{78}$, a $C_{84}$, or a combination thereof.

For example, the compound may be a metal. The metal compound may comprise any metal. The examples of the metal may comprise titanium, vanadium, chromium, manganese, iron, cobalt, nickel, copper, zinc, ruthenium, rhodium, palladium, aluminum, indium, gallium, tin, silver, gold, platinum, lead, bismuth, steel, bronze, brass, or a combination thereof.

The metal compound may have any shape. For example, the metal compound may comprise a metal particle (e.g. granule), a metal wire, a metal tube, a metal sheet, or a combination thereof.

The coating may have an absorbance of the electromagnetic radiation. The absorbance of the coating may be higher than absorbance of the compound. For example, the absorbance of the coating may be at least 50 percent, at least 100 percent, at least 500 percent, or at least 800 percent higher than the absorbance of the compound.

Because the coating has an absorbance of the electromagnetic radiation higher than that of the compound, heating rate of the feedstock comprising the compound and the coating may be higher than that of a feedstock without the coating. For example, the heating rate of the feedstock comprising the compound and the coating may be at least 50 percent, at least 100 percent, at least 500 percent, or at least 800 percent higher than that of a feedstock without the coating.

The coating may be sufficiently thick to substantially absorb electromagnetic radiation, but not too thick to cause defects in the composite object and thereby negatively impact properties of the composite object. For example, the coating thickness may be in the range of 10 nanometers to 100 micrometers, in the range of 100 nanometers to 10 micrometers, or in the range of 1 micrometer to 5 micrometers.

Any three-dimensional object prepared by using any of the feedstocks disclosed above may be within scope of this instant disclosure.

The instant disclosure also relates to a method of preparation ("preparation method"). For example, the preparation method may be preparation of a suspension of a carbon in a solvent ("method of preparation of a carbon suspension"). For example, the method may comprise processing a conditioned mixture at a high shear rate and thereby preparing a carbon suspension. In this preparation method, the conditioned mixture may be prepared by a method comprising processing a solution at a low shear rate. The low shear rate may be lower than 200,000 s$^{-1}$. The high shear rate may be equivalent to or higher than 200,000 s$^{-1}$.

In this method, first, the conditioned mixture may be prepared. The conditioned mixture may be prepared by processing a solution at a shear rate lower than 200,000 s$^{-1}$. The low shear rate processing of the solution may be achieved by using any low shear mixing equipment. Such mixing equipment is disclosed, for example, in a publication by Deutsch et al. "Mix or Match: Choose the Best Mixers Every Time: The choice is wide—from a variety of agitators, to devices that homogenize, emulsify, or disintegrate solids" Chemical Engineering, volume 105, issue 8 (August, 1998): page 70. The entire content of this publication is incorporated herein by reference.

In this method, second, a carbon suspension is prepared by processing the conditioned mixture at a shear rate higher than 200,000 s$^{-1}$. Examples of the high shear rate equipment may be rotor-stators, colloid mills, homogenizers and microfluidizers, as disclosed in Deutsch publication. Microfluidizer high shear fluid processors manufactured by Microfluidics Corporation (Westwood, Mass.) may be suitable for high shear processing of the conditioned mixture. Such microfluidizers may process the conditioned mixture at a shear rate higher than 1,000,000 s$^{-1}$. After this high shear processing, a carbon suspension comprising substantially non-agglomerated carbons may be obtained.

The solution may comprise a carbon and a solvent. The solution may be substantially free of any dispersing agent. The carbon may be substantially free of functional groups that can facilitate dispersion of the carbon compound in the solution.

The carbon may be any carbon disclosed above. For example, the carbon may comprise a nanocarbon, a pyrolytic carbon, a graphite, an activated carbon, an amorphous carbon, a carbon fiber, or a combination thereof. For example, the coating may comprise a nanocarbon. The nanocarbon may be a non-agglomerated nanocarbon. Examples of the nanocarbon may be a carbon nanotube (CNT), a graphene (GR), a fullerene (FL), or a combination thereof. Examples of the carbon nanotube may be a single-wall carbon nanotube, a double-wall carbon nanotube, a multi-wall carbon nanotube, or a combination thereof. For example, the coating may comprise a graphene. Examples of the graphene may be a single layer graphene, a double layer graphene, a multilayer graphene, a graphene strip, or a combination thereof. For example, the coating may comprise a fullerene. Examples the fullerene may be a $C_{60}$, a $C_{70}$, a $C_{76}$, a $C_{78}$, a $C_{84}$, or a combination thereof.

In this method, the solvent may be any solvent. For example, the solvent may comprise water, an acid, a base, an aromatic solvent, an alcohol, an aromatic solvent, benzene, halogenated benzene, xylene, toluene, a dichlorobenzene, dimethylformamide, formamide and its derivatives, N-methylpyrrolidinone, dichloroethane, dibromoethane, carbon disulfide, pyridine, or a combination thereof.

In this method, the conditioned mixture may substantially be free of any dispersing agent.

The preparation method may further comprise depositing the carbon suspension on a surface of a metal compound.

The metal compound may comprise any metal. For example, the metal compound may comprise titanium, vanadium, chromium, manganese, iron, cobalt, nickel, copper, zinc, ruthenium, rhodium, palladium, aluminum, indium, gallium, tin, silver, gold, platinum, lead, bismuth, steel, bronze, brass, or a combination thereof.

The metal compound may have any structural form or shape. For example, the metal compound may comprise a metal particle, a metal wire, a metal tube, a metal sheet, or a combination thereof.

The preparation method may further comprise removing the solvent; thereby forming a coating on a surface of the metal compound; and thereby preparing a feedstock. The solvent may be removed until the feedstock is substantially free of solvent. The solvent may be removed by any technique. For example, the solvent may be removed by evaporation, centrifugation, using drying agents (e.g. absorbents or adsorbents), or a combination thereof.

The coating has a thickness. The coating thickness may be in the range of 10 nanometers to 100 micrometers; the range of 100 nanometers to 10 micrometers; or in the range of 1 micrometer to 5 micrometers.

After the removal of the solvent, the coating may essentially comprise the carbon.

Any three-dimensional composite object prepared by using the carbon suspension prepared by the method disclosed above may be within the scope of the instant disclosure.

The instant disclosure also relates to a carbon containing photocurable formulation. This formulation may comprise a carbon; a photocurable resin; and a photoinitiator (i.e. photocatalyst). The carbon containing photocurable formulation, when cured, may yield a polymer composite with an electrical resistivity lower than or equivalent to 100 ohmcm, or lower than or equivalent to 10 ohmcm, or lower than or equivalent to 1 ohmcm, or lower than or equivalent to 0.1 ohmcm.

The carbon containing photocurable formulation may comprise a nanocarbon, a pyrolytic carbon, a graphite, an activated carbon, an amorphous carbon, a carbon fiber, or a combination thereof. The carbon may comprise a nanocarbon. The carbon may comprise a non-agglomerated nanocarbon. The nanocarbon may comprise a carbon nanotube, a graphene, a fullerene, or a combination thereof. The carbon nanotube may comprise a single-wall carbon nanotube, a double-wall carbon nanotube, a multi-wall carbon nanotube, or a combination thereof. The graphene may comprise a single layer graphene, a double layer graphene, a multilayer graphene, a graphene strip, or a combination thereof. The fullerene may comprise a $C_{60}$, a $C_{70}$, a $C_{76}$, a $C_{78}$, a $C_{84}$, or a combination thereof.

The photocurable resin may comprise a photocurable monomer, a photocurable oligomer, a photocurable polymer, or a combination thereof. The photocurable resin may comprise a monomer, oligomer, or a polymer of a hydrocarbon. The hydrocarbon may be any hydrocarbon. For example, the hydrocarbon may be an acrylate, a methacrylate, an epoxy, a urethane, an ester, a silicone, a styrene, or a combination thereof. For example, the hydrocarbon may comprise a monofunctional hydrocarbon, a difunctional hydrocarbon, a trifunctional hydrocarbon, a multifunctional hydrocarbon, or a combination thereof.

The carbon containing photocurable formulation has a viscosity. The viscosity of the carbon containing photocurable formulation is in the range of 1 millipascalsecond to 1,000 millipascalsecond at about 25° C.; or in the range of 10 millipascalsecond to 300 millipascalsecond at about 25° C.; or in the range of 50 millipascalsecond to 150 millipascalsecond at about 25° C.

The carbon containing photocurable formulation may comprise a carbon nanotube, and wherein the carbon nanotube may comprise a single-wall carbon nanotube, a double-wall carbon nanotube, a multi-wall carbon nanotube, or a combination thereof; wherein the carbon containing photocurable formulation, when cured, may yield a polymer composite with an electrical resistivity lower than or equivalent to 1 ohmcm.

Any three-dimensional polymer composite object prepared by using any of the carbon containing photocurable formulations disclosed above is within the scope of the instant disclosure.

The instant disclosure also relates to a method of preparation of a carbon containing photocurable formulation. The method may comprise processing a conditioned photocurable mixture at a high shear rate and thereby preparing a carbon containing photocurable formulation. The conditioned photocurable mixture may be prepared by a method comprising processing a photocurable mixture at a low shear rate. The photocurable mixture may comprise a carbon, a photocurable resin, and a photoinitiator. The high shear rate may be equivalent to or higher than 200,000 $s^{-1}$; or equivalent to or higher than 500,000 $s^{-1}$; or equivalent to or higher than 1,000,000 $s^{-1}$; or equivalent to or higher than 10,000,000 $s^{-1}$. The low shear rate may be lower than 200,000 $s^{-1}$.

The conditioned photocurable mixture may substantially be free of any dispersing agent. The photocurable mixture may be substantially free of any dispersing agent.

The carbon may substantially be free of functional groups that can facilitate dispersion of the carbon compound in the mixture.

The carbon may comprise a nanocarbon, a pyrolytic carbon, a graphite, an activated carbon, an amorphous carbon, a carbon fiber, or a combination thereof. The nanocarbon may comprise a carbon nanotube, a graphene, a fullerene, or a combination thereof. The carbon nanotube may comprise a single-wall carbon nanotube, a double-wall carbon nanotube, a multi-wall carbon nanotube, or a combination thereof. The graphene may comprise a single layer graphene, a double layer graphene, a multilayer graphene, a graphene strip, or a combination thereof. The fullerene may comprise a $C_{60}$, a $C_{70}$, a $C_{76}$, a $C_{78}$, a $C_{84}$, or a combination thereof.

The photocurable resin may comprise a monomer, oligomer or a polymer of an acrylate, a methacrylate, an epoxy, a urethane, an ester, a silicone, a vinyl alcohol, a vinyl acetate, an alkene, a glycerol, a glycol, a ketone, or a combination thereof.

The carbon containing photocurable formulation has a viscosity, wherein the viscosity of the carbon containing photocurable formulation may in the range of 1 millipascalsecond to 1,000 millipascalsecond at about 25° C.; or in the range of 10 millipascalsecond to 300 millipascalsecond at about 25° C.; or in the range of 50 millipascalsecond to 150 millipascalsecond at about 25° C.

The carbon containing photocurable formulation, when cured, may yield a polymer composite with an electrical resistivity lower than or equivalent to 100 ohmcm; or lower than or equivalent to 10 ohmcm; or lower than or equivalent to 1 ohmcm; or lower than or equivalent to 0.1 ohmcm.

In this preparation method the carbon may comprise a carbon nanotube. The carbon nanotube may comprise a single-wall carbon nanotube, a double-wall carbon nanotube, a multi-wall carbon nanotube, or a combination thereof. The carbon containing photocurable formulation, when cured, may yield a polymer composite with an electrical resistivity lower than or equivalent to 1 ohmcm.

Any three-dimensional polymer composite object prepared by using any of the carbon containing photocurable formulation disclosed above, which may be prepared by any of the methods suitable for preparation of such formulations may be within the scope of the instant disclosure.

As disclosed above, the CNT materials may be synthesized by variety of CNT synthesis methods. The CNT formation and growth may stop during the synthesis. The CNT formation and growth may stop due to decreased catalyst activity when the catalyst's surface is covered with an amorphous carbon layer. Or, the CNT formation and growth may be stopped after a pre-determined period of synthesis. At this process stage, the CNTs are "as-synthesized CNTs".

The as-synthesized CNTs may be processed before they are used. For example, the as-synthesized CNTs may be incorporated into a liquid or mixed with a liquid. This incorporation may be done, for example, to dissolve impurities (e.g. non-CNT material), to provide a CNT suspension, or a combination thereof. Examples of impurities may be non-CNT carbons (e.g., amorphous carbon), inorganic catalysts, catalyst supports, or a combination thereof.

The liquid mixture at this process stage may comprise a liquid and an as-synthesized nanocarbon ("the nanocarbon slurry"). The liquid may comprise any liquid. For example, the liquid may comprise water, or mixtures thereof. The solvent may comprise any solvent. For example, the solvent may comprise a hydrocarbon solvent such as alcohol, ketone, ester, ether, alkane, alkene, aromatic hydrocarbons (such as benzene and various derivatives), or mixtures thereof. The nanocarbon slurry may further comprise an acid, a base, a suspension agent, or a combination thereof.

In one example, the CVD process may involve passing a hydrocarbon vapor through a reactor at a sufficiently high temperature, varying in the range of 600° C. to 1200° C., and in presence of a catalyst to decompose the hydrocarbon. In one example, the catalyst may comprise metals and/or metal oxides (e.g., Fe, Co, Ni, Mo, their oxides, and a combination thereof). The catalyst may be nanoparticles of such metals and/or metal oxides. In one example, support material may comprise alumina, silica, magnesium oxide, and a combination thereof. The CNTs may form and grow on catalyst particles in the reactor and may be collected upon cooling the system to a room temperature. These CNTs collected directly from the reactor and not yet treated in any way are the as-synthesized CNTs. The as-synthesized CNTs may comprise at least 50 wt % inorganic impurities including the catalyst and the support material, which may need to be removed to produce a material comprising CNTs with desired properties.

In one example, the as-synthesized CNTs may be purified by being immersed in acids (such as $H_2SO_4$, $HNO_3$, HCl, and a combination thereof) and refluxed for a period varying in the range of 1 hour to 24 hours resulting in significantly decreased amount of impurities (down to a few wt % of impurities). The purified CNT material may be thoroughly washed to remove any residual acid and then dried in a convection oven at a temperature varying in the range of 20° C. to 150° C. for a period varying in the range of 1 hour to 48 hours.

The as-synthesized and purified CNTs may easily be dispersed in the liquid since they may not be substantially agglomerated. However, upon being wetted and subsequently dried, the CNT material may be converted into an agglomerated and tangled mat comprising irregular clusters of individual CNTs, as shown in FIG. 1. This post-drying transition may occur due to high amount of the CNTs' atomically smooth surface and attendant large surface energy. This condition may make the conformation of straight individual CNTs energetically unstable and susceptible to deformation and agglomeration.

The instability may greatly be enhanced by introducing a liquid between individual CNTs and then evaporating the liquid. In other words, wetting and then drying CNTs may induce severe agglomeration due to attraction forces exerted by liquids in intimate contact with the CNT surface. Upon drying, CNTs may coalesce into large bundles (including tens to hundreds of CNTs in cross section), which then form a highly tangled structure, as shown in FIG. 1 by way of example. These agglomerated structures may not exhibit many of the remarkable properties expected of individual, well-dispersed and/or isolated CNTs.

Commercially available CNT materials are typically those of the purified and dried grade, marketed either as a powder obtained after drying, or as a CNT suspension produced by re-dispersing the dry purified powder in either an aqueous or organic solvent. The commercially available purified grades of the CNT materials ("the commercial CNTs") may undergo at least one wetting and drying cycle before they are supplied to a user. The commercial CNTs may thereby have agglomerated structures.

It may then be difficult to disperse this agglomerated structure down to the level of individual CNTs that may be required for many applications. To accomplish this task, commercially available grades of CNT materials may have to be subjected to vigorous harsh treatments that may consume a lot of energy and inflict considerable collateral damage upon the CNT material (e.g., by destroying some CNTs, creating defects in CNT walls, and/or cutting CNTs into shorter segments) resulting in degraded nanocarbon material properties.

In one example, this disclosure relates to a method comprising using the as-synthesized CNTs, the non-agglomerated and/or non-damaged CNTs, the CNT slurry, or the combination thereof in preparation of the nanocarbon composites. The drying-induced agglomeration and entanglement, as well as damage during processing of agglomerated CNT may thereby be avoided. For example, the purified CNTs may be kept in a suspension or, at least, as the nanocarbon slurry (the "purified CNT slurry"). In other words, the as-synthesized CNT materials may be purified by refluxing in acids but then never be allowed to dry before reaching the customer, instead being kept as the purified CNT slurry. The customer may either use the purified CNT slurry or, if necessary, exchange the liquid with another liquid and process the CNT slurry as desired, allowing it to dry only at the final step of their process. This arrangement would significantly facilitate dispersion and prevent damaging of CNT materials resulting in improvement of product properties and performance.

The process of dispersing the purified CNT slurry material down to the level of individual CNTs may be accomplished through any of mixing, sonicating, or homogenizing techniques, or a combination thereof. As compared to the current commercial CNT materials, the dispersion of the purified CNT slurry material may require much less effort and inflict much less damage to CNTs in the process of achieving the desired degree of dispersion. The same considerations may apply to other types of nanocarbon materials. Higher degree of dispersion and reduced damage to nanocarbon structure may result in improved properties. The dispersion process may be carried out in either aqueous or organic solvents. Examples of aqueous or organic solvents may comprise water, toluene, alcohol, carbon disulfide, dichlorobenzene, other benzene derivatives, aromatic solvents, dimethylformamide, N-methylpyrrolidinone, pyridine, and mixtures thereof.

The purified CNT slurry may comprise a liquid and a CNT. The CNT may comprise less than 80 wt %, less than 50 wt %, or less than 10 wt % of the CNT slurry. Presence of sufficient number of liquid molecules in intimate contact with CNTs stabilizes the system and prevents CNT agglomeration.

A convenient method to evaluate the degree of agglomeration of CNTs incorporated into composite materials may be through examination of scanning electron microscopy (SEM) and/or transmission electron microscopy (TEM) images. The CNT agglomerates are readily visible in SEM and/or TEM images at magnifications 1,000 or 30,000 times and less, depending on agglomerate size. The non-agglomerated CNTs are much smaller in size and may be seen in SEM and/or TEM images at magnifications 40,000 or 80,000 times and higher.

The damage to CNTs caused by a harsh dispersion process may be evaluated by measuring Raman spectroscopy, in particular, using the intensity ratio of the so-called G-band and D-band. The G-bands that are typically detected at about 1,580 cm$^{-1}$ (within ±20 cm$^{-1}$) are due to the non-defective graphitic CNT structure of, while the D-bands (at about 1,350 cm$^{-1}$ within ±20 cm$^{-1}$) are predominantly due to structural defects, as disclosed by M. S. Dresselhaus, A. Jorio, A. G. Souza Filho and R. Saito, Defect characterization in graphene and carbon nanotubes using Raman spectroscopy, Phil. Trans. Royal Society A, vol. 368, pp. 5355-5377 (2010). The content of this publication is incorporated herein by reference.

The intensity ratio of the G-band to the D-band (i.e., the G/D ratio) may be used as a measure of relative concentration of CNT defects. Similar evaluation process based on G/D ratio maybe used for graphene materials, as disclosed by A. C. Ferrari, Raman spectroscopy of graphene and graphite: Disorder, electron-phonon coupling, doping and nonadiabatic effects, Solid State Communications, vol. 143, pp. 47-57 (2007). The content of this publication is incorporated herein by reference.

To evaluate the damage inflicted on CNT wall structure in the process of dispersing the CNT material, the G/D ratio may be measured and compared before and after the dispersion process. The comparison may be done using the same measurement conditions. The as-synthesized and/or the purified CNT slurry may have the same or higher G/D ratio after the dispersion, while the agglomerated CNTs (e.g., dry powder) may have decreased G/D ratio after the dispersion due to the damage inflicted on CNT material during the dispersion process. The G/D ratio of a nanocarbon incorporated in a nanocarbon composite being 80% lower than, 50% lower than, 25% lower than, 10% lower than that of the as-synthesized nanocarbon may indicate a non-damaged nanocarbon. Also, the G/D ratio of a nanocarbon incorporated in a composite being at least 80% higher than, at least 50% higher than, at least 25% higher than, at least 10% higher than, or at least equal to that of the as-synthesized nanocarbon may indicate a non-damaged nanocarbon.

The disclosure is illustrated further by the following additional examples that are not to be construed as limiting the disclosure in scope to the specific procedures or products described in them.

Example 1

As-synthesized multi-wall CNT material (comprising about 85 wt % inorganic impurities) was refluxed in excess amount of about 1M HCl for about 5 hours, and then filtered to remove the main volume of the acid while keeping the CNT material wet. The purified product (comprising about 2 wt % inorganic impurities) was washed two times with de-ionized water to remove the residual acid, and then separated into three parts for the experiments described in other Examples. The first part was dried in a convection oven at about 120° C. for about 4 hours. The second part was kept wet and refluxed in water (at CNT concentration of about 2 g/L) for about 5 hours to loosen up the CNTs. The third part was washed with copious amounts of toluene three times thereby substantially replacing the water with toluene as a solvent and bringing the CNT concentration to about 2 g/L. Then, the CNT-toluene suspension was refluxed for about 5 hours. Finally, both these CNT suspensions (one in water and one in toluene) were separately passed 2 times through a Microfluidizer high shear fluid processor (LM-10, Microfluidics Corporation, Newton, Mass.) at 20,000 psi pressure yielding two suspensions of non-agglomerated and/or non-damaged CNTs. These suspensions were stable over the period of 4 weeks. The G/D ratio as measured with about 532 nm laser excitation varied in the range of 1.2 to 1.6, both before and after dispersion indicating that the concentration of structural defects did not change. All the above treatment steps are scalable and highly reproducible.

Example 2

Dried powder of purified multi-wall CNT material prepared in Example 1 as the first part was dispersed following exactly the same process as the other two parts. To produce a stable CNT suspension, the dry powder was first refluxed in water at CNT concentration of about 2 g/L for about 5 hours, then passed 2 times through the Microfluidizer. The G/D ratio for the multi-wall CNT dry powder material as measured with about 532 nm laser excitation may vary in the range of 1.1 to 1.4. After dispersing, the G/D ratio decreased to a level varying in the range of 0.4 to 0.8 indicating increased concentration of CNT defects.

The multi-wall CNT material may be provided, for example, by Thomas Swan & Co Ltd (UK), Nanocyl (Belgium), or many other suppliers. The step of Microfluidizer treatment may be combined or substituted with any high shear mixing, sonication, wet ball milling, another similar treatment, or a combination thereof. Similar simple and efficient process may be designed to produce the as-synthesized or the purified non-agglomerated and/or non-damaged CNT slurries.

A highly dispersed and stable suspension of non-agglomerated and/or non-damaged CNT material ("the well-dispersed CNT suspension") in either water or organic solvents is thereby obtained. The well-dispersed CNT suspension may be used in preparation of composites suitable for the 3D printing.

In the case of SLS and FDM technologies that use metal or plastic powder as feedstock, there is a technical challenge of mixing nanocarbons with metal or plastic powders in a way that prevents nanocarbons from becoming airborne, and also affords achieving the desired proportions. Dry nanocarbon is comprised of particles that may be small (.about.mm or less in length, width, thickness, and/or specific dimension) and have relatively low density (varying in the range of 0.005 g/cc to 0.5 g/cc). These lightweight nanocarbon particles may easily get airborne thereby presenting potential health hazard and affecting the nominal nanocarbon-to-metal or nanocarbon-to-plastic ratio.

Figure 2:
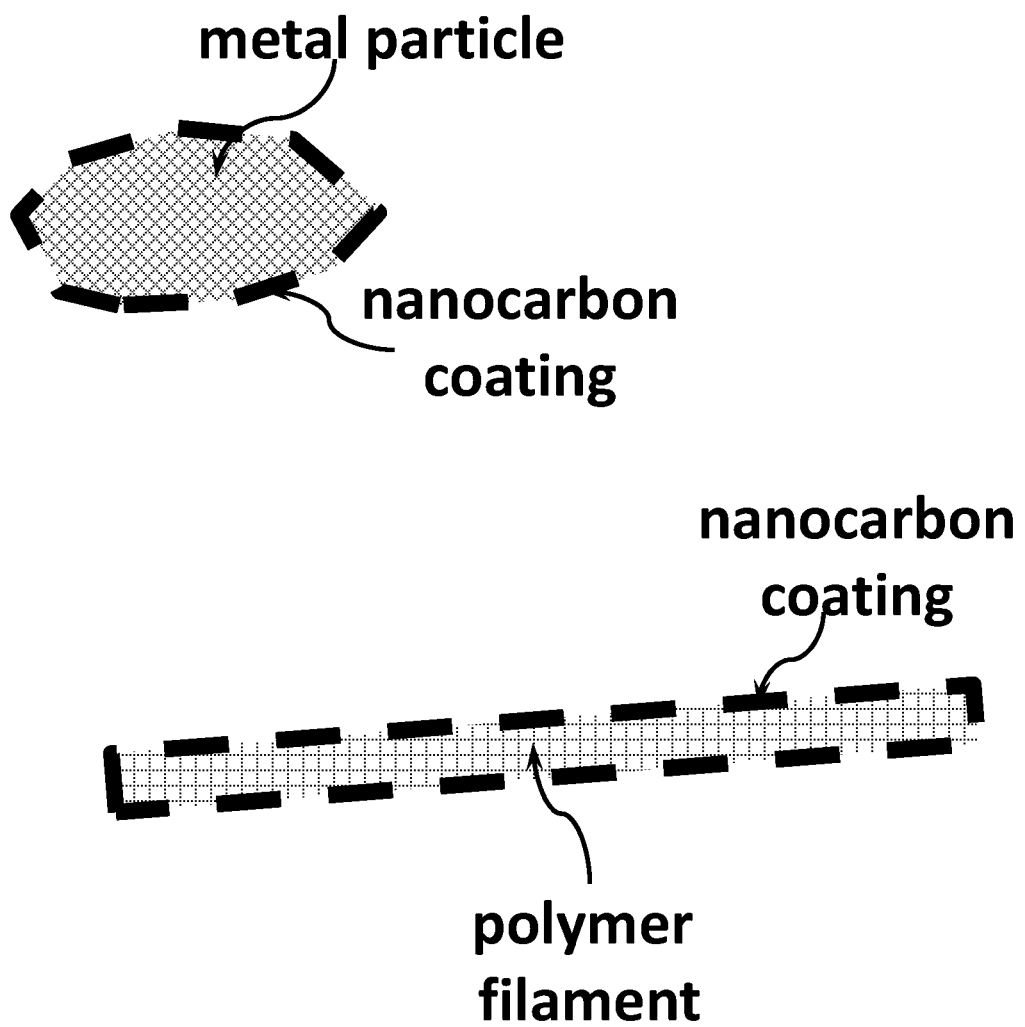
FIG. 2. An example of a metal particle (or granule) (left) and a polymer filament (right) coated with a nanocarbon (e.g., CNT) coating. The metal and polymer materials are both shown in grey color, and the nanocarbon coating is shown in black color.

This problem is solved by devising a process to physically attach the lightweight nanocarbon particles to surfaces of metal or plastic particles which may be denser and easier to feed. This step is carried out prior to feeding the particles into the 3D printer, so that the feedstock may comprise a metal or plastic core coated with a nanocarbon shell, as shown in FIG. 2.

On practical level, nanocarbon particles may be coated and attached to metal particles through a variety of coating techniques using a suspension of a nanocarbon in an either aqueous or organic solvent, such as spray coating, dip coating, spin coating, wet ball milling, etc. Process parameters are determined by type of a nanocarbon, type of a metal, shape and size of the particles, conditions of the surfaces (such as terminating functional group). The strength of adhesion may need to be just sufficient to allow the metal particles to be processed up to the sintering or melting step without causing detachment of the coated nanocarbons.

After the sintering or melting step, the coated nanocarbons may be captured and incorporated within the metal matrix leading to improved properties. Incorporation of the non-agglomerated and/or non-damaged CNT into metal structure may result in a CNT composite with improved electrical, thermal, mechanical, and other properties that may be suitable for 3D-printed products.

Exemplary procedures to produce CNT-coated metal or plastic particles are described in Examples 3-7, 9-12, and CNT-coated filaments—in Example 8.

Example 3

Iron powder granules (average diameter about 50 micrometers) were immersed into the aqueous CNT suspension of Example 1, agitated for about 2 hours with a magnetic stirrer at 1,000 rpm, then allowed to dry in a convection oven at about 120° C. for about 4 hours. Weight uptake by the granules yielded the amount of attached CNT of about 0.06 wt %. Examination under microscope has shown the average CNT coating thickness of 5 micrometers. The CNT-coated iron granules may be used as a feedstock for SLS, SLM, and related type 3D printers.

Example 4

Iron granules (average diameter about 50 micrometers) were immersed into the toluene suspension of non-agglomerated and/or non-damaged CNT of Example 1 and subjected to a modified wet ball milling process. In particular, the wet iron/CNT mixture was agitated for about 30 minutes in a ball milling apparatus either with the standard balls (batch 1), or with the standard balls removed (batch 2). Due to the repeated impacts with iron granules or the standard balls, CNTs get attached to the metal surface. The mixture was dried in a convection oven at about 150° C. for about 4 hours. Alternatively, the solvent may be removed by other methods, such as centrifuging. The amount of attached CNT was about 0.05 wt % and about 0.08 wt % in batches 1 and 2, respectively. The average coating thickness was 2 and 3 micrometers in batches 1 and 2, respectively. The CNT-coated iron granules may be used as a feedstock for SLS, SLM, and related type 3D printers.

Other type CNTs, graphenes and/or fullerenes may also be employed in this application either alone or in various combinations. Graphene may be present either as graphene oxide (which may have to be reduced back to graphene, e.g., through reaction with hydrazine) or pure graphene. The described process may also be used for other metals, such as titanium, vanadium, chromium, manganese, cobalt, nickel, copper, zinc, ruthenium, rhodium, palladium, aluminum, indium, gallium, tin, silver, gold, platinum, lead, bismuth, and alloys, such as steel, bronze, brass, and a combination thereof. These nanocarbons, metals, and/or alloys may be commercially available from many suppliers.

Plastics may also be utilized in a manner described in this example (customized for their particular properties, e.g., softening temperature). Examples of such plastics may comprise such as ABS (acrylonitrile butadiene styrene), polyamide, nylon, polycarbonate, polyethylene, polypropylene, polyetherimide, polyphenylsulfone, polylactic acid, and a combination thereof. Any of those plastics may commercially be available from many suppliers. Metal-plastic blends may also be used. The resulting 3D printed nanocarbon composite may exhibit improved electrical, thermal, and mechanical properties.

Example 5

Figure 3:
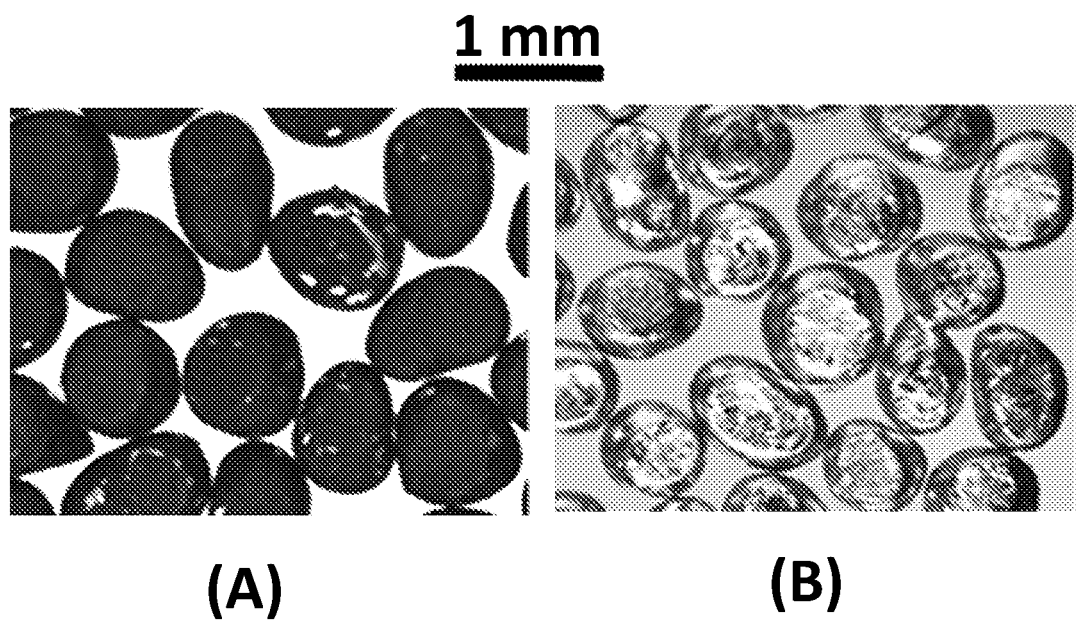
FIG. 3. (A) CNT-coated granules and (B) pure (i.e. uncoated) aluminum granules. The scale bar in the center is about 1 mm and refers to both photographs.

Aluminum granules (average diameter about 800 micrometers) were immersed into the toluene suspension of non-agglomerated and/or non-damaged CNT prepared in Example 1 and agitated for about 30 minutes in a ball milling apparatus either with the standard balls (batch 1), or with the standard balls removed (batch 2). The mixture was dried in a convection oven at about 150° C. for about 4 hours. The CNT-coated granules appear black and non-reflective (FIG. 3(A)), while pure aluminum granules appear white and shiny (FIG. 3(B)). The amount of attached CNT was about 0.08 wt % in batch 1 and about 0.23 wt % in batch 2. The average CNT coating thickness was about 1 micrometer and about 25 micrometers in batches 1 and 2, respectively. The CNT-coated aluminum granules may be used as a feedstock for SLS, SLM, and related type 3D printers.

Example 6

Figure 4:
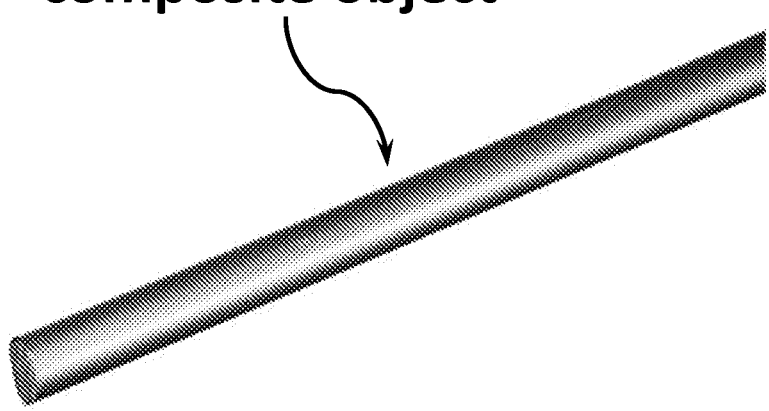
FIG. 4. As-cast cylinder-shaped aluminum-CNT composite.
Figure 5:
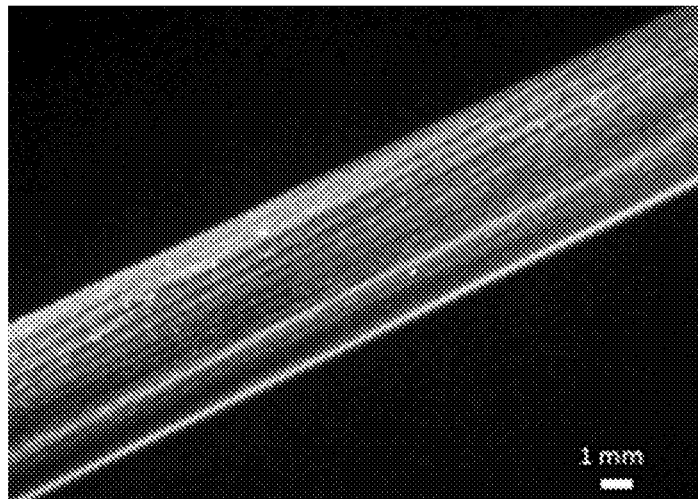
FIG. 5. Optical microscope images of the surface of aluminum-CNT composites: (A) batch 1 and (B) batch 2. The arrow shows a defect.
Figure 5:
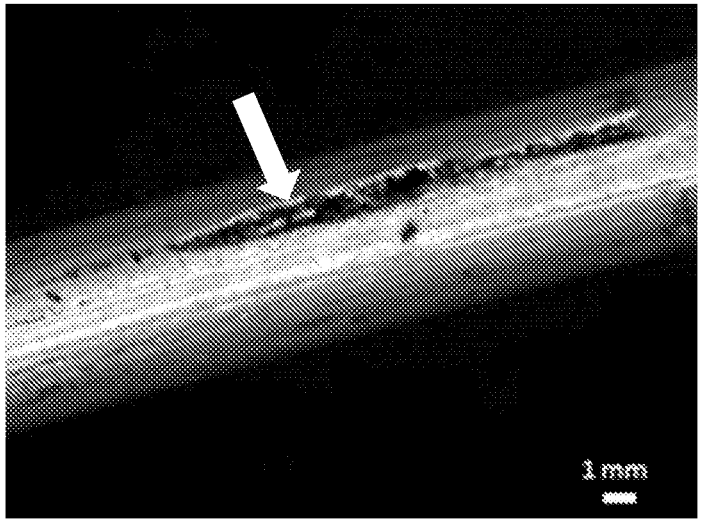
Figure 6:
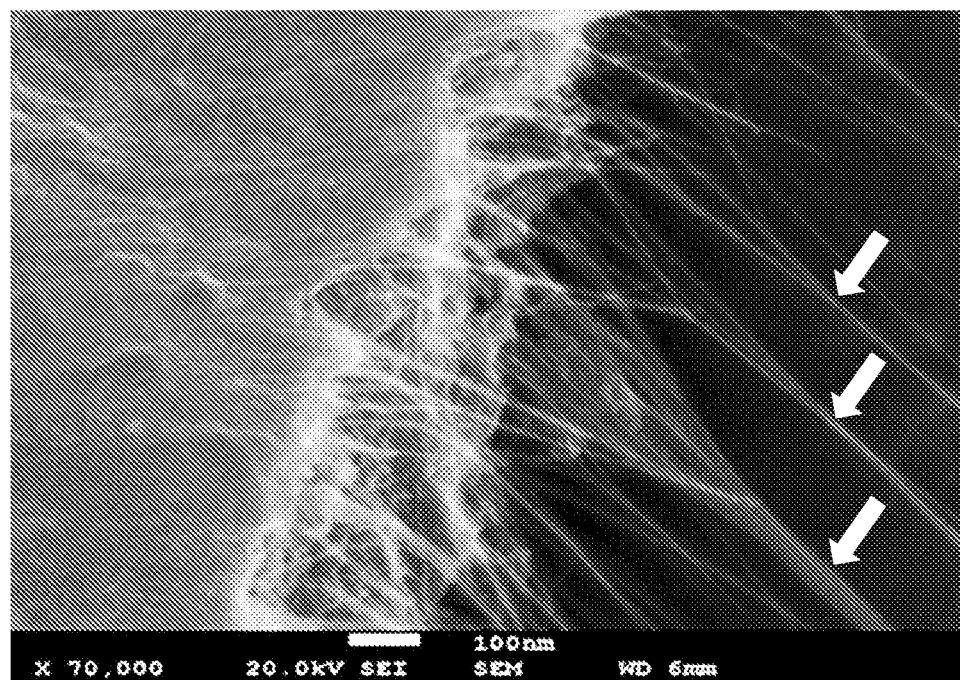
FIG. 6. High magnification (×70,000) scanning electron microscope (SEM) image of the surface defect on the composite of batch 2 revealing presence of CNT agglomerates shown by arrows.

The batch 1 CNT-coated aluminum granules of Example 5 were used to produce aluminum-CNT composite objects and evaluate their properties. The composite objects were fabricated by melting the CNT-coated aluminum granules under argon atmosphere at about 750° C. for about 1 hour while stirring to homogenize the melt, then casting the melt into a cylinder-shaped die (0.7 cm in diameter and 15 cm in height) and cooling down to 20° C. (FIG. 4). Under optical microscope, no defects could be observed on surfaces of batch 1 samples (FIG. 5(A)), while multiple defects were observed on batch 2 samples (shown by the arrow in FIG. 5(B)). Examination with SEM at high magnification showed that these defects were due to CNT agglomerates (FIG. 6). Pure aluminum samples were prepared as reference following exactly the same procedure but from uncoated aluminum granules. Electrical resistivity, tensile strength, and elongation were evaluated at about 20° C. for both CNT-containing and pure aluminum cast samples without any further treatment of the samples. The electrical resistivity was measured using four probe technique, and the tensile properties were evaluated with an Instron (Norwood, Mass.) Testing System. For the reference pure aluminum sample, the electrical resistivity was about 2.83 microOhmscm, tensile strength was about 142 MPa, and elongation was about 6%. For the CNT-containing aluminum sample (batch 1), the electrical resistivity was about 2.71 microOhmscm, tensile strength was about 165 MPa, and elongation was about 7%. To summarize, in the aluminum-CNT composite (batch 1), electrical resistivity was decreased by about 4%, tensile strength was increased by about 16%, and elongation was increased by about 17%, compared to the pure aluminum. Hence, the properties of the aluminum-CNT composite were improved if there was no agglomeration of CNT.

Example 7

The batch 2 CNT-coated aluminum granules of Example 5 were used to produce aluminum-CNT composite objects according to the procedures of Example 6 and evaluate their properties. For the aluminum-CNT composite of batch 2, the electrical resistivity was about 3.14 microOhmscm, tensile strength was about 115 MPa, and elongation was about 3%. To summarize, in the aluminum-CNT composite (batch 2), electrical resistivity was increased by about 10%, tensile strength was decreased by about 18%, and elongation was decreased by about 50%, compared to the reference pure aluminum sample. The partial degradation of properties in the aluminum-CNT composite of batch 2 may be attributed to the agglomeration of CNT (FIG. 6) captured within structure of the composite object.

Example 8

Figure 7:
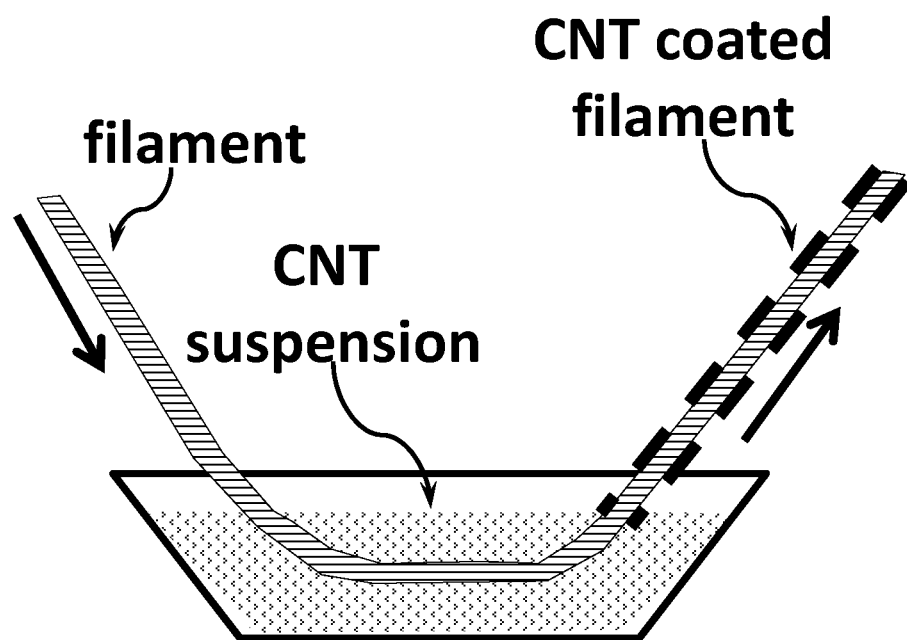
FIG. 7. An example of a metal or polymer filament (grey color) drawn through a nanocarbon (e.g., CNT) suspension (black color). The arrows indicate the drawing direction. The pristine filament enters into the nanocarbon suspension on the left side, and the nanocarbon-coated filament exits from the right side.

In the case of FDM technology which uses metal or polymer wires or filaments as a feedstock, a wire or filament may be coated with non-agglomerated and/or non-damaged CNT through the procedures illustrated in FIG. 2 and FIG. 7. A commercial polyamide plastic filament (typically, about 1-2 mm in diameter) maybe continuously drawn through a bath containing the aqueous suspension of non-agglomerated and/or non-damaged CNT of Example 1 allowing each segment of the filament to reside in the bath for certain amount of time, such as about 1 minute to about 15 minutes. The suspension maybe continuously agitated with a magnetic stirrer to keep CNT distribution uniform. While being drawn through the suspension, the filament or wire will be coated with CNT particles.

After exiting the bath, the filament or wire may be dried by passing it through a convection oven heated to about 80° C. (i.e., safely below the plastic's thermal degradation or softening temperatures). In case of metal wires with relatively high melting or softening temperatures (such as above ~300° C.), the drying process may be carried out under inert atmosphere to prevent nanocarbon combustion. After drying, the CNT particles adhere to the surface of plastic filaments and thereby are transported to the extrusion nozzle of the FDM or related type 3D printer. In the extrusion nozzle, the CNT is mixed with melted polymer or metal and extruded thereby becoming incorporated into the structure of the 3D-printed object and producing a carbon composite product.

The bath can be envisaged as an attachment for commercial FDM and related type 3D printers enabling these commercial printers to produce carbon-containing products. These carbon-containing products are electrically conducting 3D-printed plastic objects which can be produced from a variety of commercially available filaments and/or wires. The incorporation of CNT into plastic imparts increased electrical and thermal conductivity, improved mechanical and thermal properties, as well as decreased flammability.

Other type CNTs, graphenes and/or fullerenes may also be employed in this application either alone or in various combinations. Graphene may be present either as graphene oxide (which may be reduced back to graphene, e.g., through the reaction with hydrazine) or pure graphene. Other plastics may also be utilized in a manner described in this example (customized for their particular properties, e.g., softening temperature). Examples of such plastics may comprise ABS (acrylonitrile butadiene styrene), polyamide, nylon, polycarbonate, polyethylene, polypropylene, polyetherimide, polyphenylsulfone, polylactic acid, a combination thereof, and a blend thereof. Any of those plastics may commercially be available from many suppliers. The resulting 3D printed product comprising nanocarbon composite plastic exhibit increased electrical and thermal conductivity, improved electrical, thermal, and mechanical properties, as well as decreased flammability.

The described process may also be used for other metals, such as titanium, vanadium, chromium, manganese, cobalt, nickel, copper, zinc, ruthenium, rhodium, palladium, aluminum, indium, gallium, tin, silver, gold, platinum, lead, bismuth, and alloys, such as steel, bronze, brass, and a combination thereof. Metal-plastic blends may also be used.

Example 9

A typical procedure to produce electrically conducting 3D-printable photopolymer resin for use in SLA technology is described in this example.

The toluene suspension of non-agglomerated and/or non-damaged CNT prepared according to the process described in Example 1 may be added to a liquid acrylic resin in a desired proportion and agitated for about 5 hours at about 50° C. with a magnetic stirrer to ensure uniform distribution of CNT throughout the resin's volume. The liquid acrylic resin may be, in particular, MakerJuice SF resin, and the CNT suspension may be added at about 20 wt %. The CNT content in the resin should be high enough to ensure desired electrical conductivity, but also low enough to keep the viscosity below about 1,000 (millipascalsecond) at about 25° C. otherwise the resin will be difficult to 3D print. Other commercially available resins, different proportions of the CNT suspension, and different solvents may also be used. For example, aromatic solvents with covalently attached photocurable functional groups, such as acrylic, metacrylic, and/or epoxy and their combinations, may be used instead of toluene to disperse and suspend CNT and further serve as photocurable resin ingredients. Examples of such photocurable resin ingredients are benzyl 2-ethyl acrylate, benzyl methacrylate, pyridine acrylate, toluene acrylate, xylene acrylate, and the like. The resin ingredients may comprise a single photocurable functional group (e.g., mono-acrylates), two photocurable functional groups (e.g., di-acrylates), multiple photocurable functional groups (e.g., tri-, tetra, and other poly-acrylates), and their combinations. The resulting CNT-containing resin is then loaded into an SLA 3D printer. Under a UV or visible light irradiation, the acrylic resin solidifies through a photopolymerization reaction forming the desired 3D-printed plastic object defined by a computer system configured for this purpose. In the photopolymerization process, the suspended non-agglomerated and/or non-damaged CNTs are captured within the newly formed polymer structure imparting increased electrical and thermal conductivity, improved mechanical and thermal properties, as well as decreased flammability.

Example 10

An alternative (to Example 9) approach to producing electrically conducting 3D-printable photopolymer resin for use in SLA technology is described in this example.

Figure 8:
FIG. 8. Examples of 3D-printed polymer composite objects: (A) CNT-based composite object of Example 10, (B) Ce-based composite object of Example 11, and (C) reference polymer object (with no carbon) of Example 12.
Figure 8:
Figure 8:
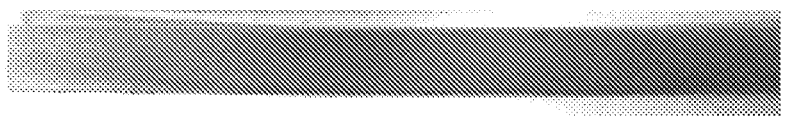

A 250 mg of as-received single-wall CNT (Thomas Swan, Elicarb® SWNT) was added to 90 mL of bisphenol-A [4 EO] diacrylate (IGM Resins, Photomer 4062) and 30 mg of Nonyl phenol [4 EO] acrylate (IGM Resins, Photomer 4003), mixed by stirring with magnetic stirrer bar at 1,000 rpm and about 40° C. for 5 hours. Then, 80 mL of pentaerythritol [5 EO] tetraacrylate (IGM Resins, Photomer 4172), 50 mL polyethylene glycol (200) di-methacrylate (IGM Resins, Photomer 2050), and 250 mg 2,4,6-trimethylbenzoyl-diphenyl phosphine oxide (IGM Resins, Omnirad TPO) were added to the mixture and stirred for additional 5 hours at about 1,000 rpm and about 40° C. In the finishing step, the mixture was passed once through a Microfluidizer device (Microfluidics, LM-10) to ensure good dispersion of CNT and other ingredients. The resulting resin was loaded into Formlabs Form1+SLA 3D printer to produce electrically conducting 3D-printed plastic objects of various shapes (FIG. 8(A)). Both the resin and the 3D-printed objects were of black color. Electrical resistivity was measured in 3D-printed objects shaped as rectangular strips (about 10 cm in length, about 2 cm in width, about 0.2 cm in thickness) using a four-probe technique. The electrical resistivity at about 25° C. was about 1 Ohmcm on average with standard deviation of about 15%.

Example 11

This example describes an electrically conducting 3D-printable photopolymer resin suitable for use in SLA technology similar to Example 10.

A 1,500 mg of as-received Fullerene-$C_{60}$ (Sigma Aldrich, 99.5%, #379646) was added to 120 mL of bisphenol-A [4 EO] diacrylate (IGM Resins, Photomer 4062), 80 mL of pentaerythritol [5 EO] tetraacrylate (IGM Resins, Photomer 4172), 50 mL polyethylene glycol (200) di-methacrylate (IGM Resins, Photomer2050), and 500 mg 2,4,6-trimethyl-benzoyl-diphenyl phosphine oxide (IGM Resins, Omnirad TPO). The mixture was stirred with magnetic stirrer bar at 1,000 rpm for 20 hours and about 50° C. Then, the mixture was passed once through a Microfluidizer device (Microfluidics, LM-10) to ensure good dispersion of the ingredients. The resulting resin was loaded into Formlabs Form1+ SLA 3D printer to produce electrically conducting 3D-printed plastic objects of various shapes (FIG. 8(B)). Both the resin and the 3D-printed objects were of brown color. Electrical resistivity was measured in 3D-printed objects shaped as rectangular strips (about 10 cm in length, about 2 cm in width, about 0.2 cm in thickness) using a four-probe technique. The electrical resistivity at about 25° C. was about 8 MegaOhmcm on average with standard deviation of about 50%.

Example 12

This example describes fabrication of reference photopolymer resin suitable for use in SLA technology similar to Examples 10 and 11. This resin does not contain any carbon additives and yields electrically insulating polymer objects.

A 120 mL of bisphenol-A [4 EO] diacrylate (IGM Resins, Photomer 4062), 80 mL of pentaerythritol [5 EO] tetraacrylate (IGM Resins, Photomer 4172), 50 mL polyethylene glycol (200) di-methacrylate (IGM Resins, Photomer2050), and 1,000 mg 2,4,6-trimethylbenzoyl-diphenyl phosphine oxide (IGM Resins, Omnirad TPO) were loaded together in a glass vial and stirred with magnetic stirrer bar at 1,000 rpm for 20 hours and about 50° C. Then, the mixture was passed once through a Microfluidizer device (Microfluidics, LM-10) to ensure good dispersion of the ingredients. The resulting carbon additive-free photocurable resin formulation was loaded into Form labs Form1+SLA 3D printer to produce reference 3D-printed plastic objects of various shapes (FIG. 8(C)). Both the resin and the 3D-printed objects were of weakly yellow color. Electrical resistivity was measured in 3D-printed objects shaped as rectangular strips (about 10 cm in length, about 2 cm in width, about 0.2 cm in thickness) using a four-probe technique. The electrical resistivity at about 25° C. was above the measurement range of the instrument, that is, >200 MegaOhmscm indicating that the sample was electrically insulating. Note that in this Example a much higher concentration of the photoinitiator (i.e., 2,4,6-trimethylbenzoyl-diphenyl phosphine oxide) had to be used compared to the carbon-containing resins of Examples 10 and 11. Similar photocurable formulations can be prepared using a variety of other mono- and polyfunctional acrylates, methacrylates, epoxies, styrenes, urethanes, esters, silicones, acetates, glycols, ketones, and their combinations. For example, multifunctional monomeric methacrylates include ethylene glycol dimethacrylate, diethylene glycol dimethacrylate, triethylene glycol dimethacrylate, polyethylene glycol dimethacrylate, 2,2 bis[4-(methacryloxyethoxy)phenyl] propane, tricylodecane dimethanol dimethacrylate, 1,10-decandiol dimethacrylate, 1,6-hexanediol dimethacrylate, 1,9-nonanediol dimethacrylate, neopentyl glycol dimethacrylate, 2-hydroxy 1-3 dimethacryloxy propane, trimethyolpropane trimethacrylate, ethoxylated trimethyol propane trimethacrylate, ditrimethyolpropane tetramethacrylate, tris (2-hydroxy ethyl) isocyanurate trimethacrylate, dipentaerythritol pentamethacrylate, ethyoxylated pentaerythritol tetramethacrylate, propoxylated glyceryl trimethacrylate, propoxylated trimethylolpropane trimethacrylate, and polyester dendrimer.

Other type CNTs, graphenes and/or fullerenes may also be employed in this application either alone or in various combinations. Graphene may be present either as graphene oxide or pure graphene. The graphene oxide may be expected to be reduced to pure graphene due to the UV radiation in the process of photopolymerization. Other photopolymer resins, such as methacrylates, epoxies, urethanes, polyesters, silicones, and their combinations and blends may also be used in this technique. All those polymers may be commercially available from many suppliers. Other mixing techniques such as high shear mixing, sonication, wet ball milling, or other similar treatments and their combinations may also be applied as needed.

Addition of nanocarbons to photopolymers may also impact the rate of photopolymerization reaction due to strong absorption of the UV and visible range radiation by nanocarbons and very high values for free charge carrier mobility. In nanocarbons, absorption the UV and visible range radiation may generate photo-excited electrons that may rapidly be re-distributed throughout the entire system. The overall impact may be beneficial resulting in notable increase of the reaction rate due to high mobility and eventually leading to faster production times and higher throughput, which is essential for commercial success of 3D printing technologies. Carbon-containing resins may also require less photoinitiator to start the reaction leading to cost savings since photoinitiators may be the most expensive ingredient in the photocurable resins.

In that regard, of special interest may be the fullerene photopolymer composites since fullerenes may have a rich photochemistry and, in particular, photopolymerization reactions of their own. Hence, presence of fullerenes in nanocarbon composite materials may lead to the highest improvement in the photopolymerization reaction rates.

Any combination of the above feedstocks; methods of preparation of such feedstocks; carbon containing photocurable formulations; methods of preparation of such formulations; 3D printers; 3D printers that use such feedstocks and/or such formulations; 3D objects; methods of preparation of such 3D objects by using such 3D printers, feedstocks and formulations may be within the scope of the instant disclosure.

In this specification and the appended claims, the singular forms "a," "an" and "the" include plural referents unless the context clearly dictates otherwise.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the exemplary features that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a feature is intended to and should be interpreted to embrace the corresponding structures and materials that have been described and their equivalents. Similarly, the phrase "step for" when used in a feature is intended to and should be interpreted to embrace the corresponding acts that have been described and their equivalents. The absence of these phrases from a feature means that the feature is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A method of preparing a three-dimensional composite object using a three dimensional ("3D") printer comprising:
   dispensing a feedstock;
   depositing a layer of the feedstock on a surface;
   delivering an electromagnetic radiation to selected areas of the feedstock layer; and
   preparing a three-dimensional composite object;
   wherein the feedstock comprises a metal compound and a coating formed on a surface of the metal compound;
   wherein the coating comprises nanocarbons including carbon nanotubes;
   wherein the G/D ratio of the nanocarbons in the coating is approximately the same or higher than the G/D ratio of the nanocarbons in their initial state;
   wherein the coating has a thickness; and
   wherein the coating absorbs the delivered electromagnetic radiation at the selected areas of the feedstock layer, converts the absorbed electromagnetic radiation to heat, and transfers the heat to the metal compound, thereby heating the selected areas of the feedstock layer and causing the feedstock to bond to each other and the surface on which it is deposited, and thereby forming a bonded feedstock layer.

2. The method of preparing a three-dimensional composite object using a three dimensional ("3D") printer of claim 1, further comprising:
   depositing a second layer of the feedstock on a surface of the bonded feedstock layer formed before; and
   forming another bonded feedstock layer according to claim 1.

3. The method of preparing a three-dimensional composite object using a three dimensional ("3D") printer of claim 1, wherein the coating further comprises a pyrolytic carbon, a graphite, an activated carbon, an amorphous carbon, a carbon fiber, or a combination thereof.

4. The method of preparing a three-dimensional composite object using a three dimensional ("3D") printer of claim 1, wherein the coating further comprises a non-agglomerated nanocarbon.

5. The method of preparing a three-dimensional composite object using a three dimensional ("3D") printer of claim 1, wherein the nanocarbons further comprise a graphene, a fullerene, or a combination thereof.

6. The method of preparing a three-dimensional composite object using a three dimensional ("3D") printer of claim 1, wherein the carbon nanotubes comprise a single-wall carbon nanotube, a double-wall carbon nanotube, a multi-wall carbon nanotube, or a combination thereof.

7. The method of preparing a three-dimensional composite object using a three dimensional ("3D") printer of claim 1, wherein:
   the nanocarbons further comprise a graphene; and
   the graphene comprises a single layer graphene, a double layer graphene, a multilayer graphene, a graphene strip, or a combination thereof.

8. The method of preparing a three-dimensional composite object using a three dimensional ("3D") printer of claim 1, wherein:
   the coating further comprises a fullerene; and
   the fullerene comprises a $C_{60}$, a $C_{70}$, a $C_{76}$, a $C_{78}$, a $C_{84}$, or a combination thereof.

9. The method of preparing a three-dimensional composite object using a three dimensional ("3D") printer of claim 1, wherein the metal compound comprises titanium, vanadium, chromium, manganese, iron, cobalt, nickel, copper, zinc, ruthenium, rhodium, palladium, aluminum, indium, gallium, tin, silver, gold, platinum, lead, bismuth, steel, bronze, brass, or a combination thereof.

10. The method of preparing a three-dimensional composite object using a three dimensional ("3D") printer of claim 1, wherein the metal compound comprises a metal particle, a metal wire, a metal tube, a metal sheet, or a combination thereof.

11. The method of preparing a three-dimensional composite object using a three dimensional ("3D") printer of claim 1, wherein absorbance of the coating is higher than absorbance of the metal compound.

12. The method of preparing a three-dimensional composite object using a three dimensional ("3D") printer of claim 1, wherein absorbance of the coating is at least 50 percent higher than the absorbance of the metal compound.

13. The method of preparing a three-dimensional composite object using a three dimensional ("3D") printer of claim 1, wherein absorbance of the coating is at least 100 percent higher than the absorbance of the metal compound.

14. The method of preparing a three-dimensional composite object using a three dimensional ("3D") printer of claim 1, wherein absorbance of the coating is at least 500 percent higher than the absorbance of the metal compound.

15. The method of preparing a three-dimensional composite object using a three dimensional ("3D") printer of claim 1, wherein absorbance of the coating is at least 800 percent higher than the absorbance of the metal compound.

16. The method of preparing a three-dimensional composite object using a three dimensional ("3D") printer of claim 1, wherein a heating rate of the feedstock comprising the metal compound and the coating is higher than a heating rate of a feedstock comprising the metal compound with no coating.

17. The method of preparing a three-dimensional composite object using a three dimensional ("3D") printer of claim 1, wherein a heating rate of the feedstock comprising the metal compound and the coating is at least 50 percent higher than a heating rate of a feedstock comprising the metal compound with no coating.

18. The method of preparing a three-dimensional composite object using a three dimensional ("3D") printer of claim 1, wherein a heating rate of the feedstock comprising the metal compound and the coating is at least 100 percent higher than a heating rate of a feedstock comprising the metal compound with no coating.

19. The method of preparing a three-dimensional composite object using a three dimensional ("3D") printer of claim 1, wherein a heating rate of the feedstock comprising the metal compound and the coating is at least 500 percent higher than a heating rate of a feedstock comprising the metal compound with no coating.

20. The method of preparing a three-dimensional composite object using a three dimensional ("3D") printer of claim 1, wherein a heating rate of the feedstock comprising the metal compound and the coating is 800 percent higher than a heating rate of a feedstock comprising the metal compound with no coating.

21. The method of preparing a three-dimensional composite object using a three dimensional ("3D") printer of claim 1, wherein the thickness of the coating is configured to substantially absorb the electromagnetic radiation, but not to cause defects in the composite object and thereby negatively impact properties of the composite object.

22. The method of preparing a three-dimensional composite object using a three dimensional ("3D") printer of claim 1, wherein the coating thickness is in the range of 10 nanometers to 100 micrometers.

23. The method of preparing a three-dimensional composite object using a three dimensional ("3D") printer of claim 1, wherein the coating thickness is in the range of 100 nanometers to 10 micrometers.

24. The method of preparing a three-dimensional composite object using a three dimensional ("3D") printer of claim 1, wherein the coating thickness is in the range of 1 micrometer to 5 micrometers.

25. The method of preparing a three-dimensional composite object using a three dimensional ("3D") printer of claim 1, wherein the electromagnetic radiation is delivered at a power of less than or equivalent to 5,000 watts.

26. The method of preparing a three-dimensional composite object using a three dimensional ("3D") printer of claim 1, wherein the electromagnetic radiation is delivered at a power of less than or equivalent to 1,000 watts.

27. The method of preparing a three-dimensional composite object using a three dimensional ("3D") printer of claim 1, wherein the electromagnetic radiation is delivered at a power of less than or equivalent to 500 watts.

28. The method of preparing a three-dimensional composite object using a three dimensional ("3D") printer of claim 1, wherein the electromagnetic radiation is delivered at a power of less than or equivalent to 100 watts.

29. The method of preparing a three-dimensional composite object using a three dimensional ("3D") printer of claim 1, wherein the coating is substantially free of any dispersion solvent.

30. A method of preparing a three-dimensional composite object using a three dimensional ("3D") printer comprising:
dispensing a feedstock;
depositing a layer of the feedstock on a surface;
delivering an electromagnetic radiation to selected areas of the feedstock layer; and
preparing a three-dimensional composite object;
wherein the feedstock comprises a metal compound and a coating formed on a surface of the metal compound;
wherein the coating comprises a dried-slurry dispersion comprising nanocarbons including carbon nanotubes;
wherein the coating is substantially free of surfactants, functional groups, and dispersing agents;
wherein the coating has a thickness in the range of 10 nanometers to 100 micrometers when dry; and
wherein the coating absorbs the delivered electromagnetic radiation at the selected areas of the feedstock layer, converts the absorbed electromagnetic radiation to heat, and transfers the heat to the metal compound, thereby heating the selected areas of the feedstock layer and causing the feedstock to bond to each other and the surface on which it is deposited, and thereby forming a bonded feedstock layer.

31. The method of preparing a three-dimensional composite object using a three dimensional ("3D") printer of claim 30, wherein the thickness of the coating is in the range of 100 nanometers to 10 micrometers when dry.

32. The method of preparing a three-dimensional composite object using a three dimensional ("3D") printer of claim 30, wherein the thickness of the coating is in the range of 1 micrometer to 5 micrometers when dry.

33. The method of preparing a three-dimensional composite object using a three dimensional ("3D") printer of claim 30, wherein:
the metal compound comprises titanium, vanadium, chromium, manganese, iron, cobalt, nickel, copper, zinc, ruthenium, rhodium, palladium, aluminum, indium, gallium, tin, silver, gold, platinum, lead, bismuth, steel, bronze, brass, or a combination thereof, in the form of metal granules.

\* \* \* \* \*